(12) United States Patent
Ferrara et al.

(10) Patent No.: US 12,177,493 B2
(45) Date of Patent: Dec. 24, 2024

(54) USE OF EMBEDDED SIGNALLING FOR BACKWARD-COMPATIBLE SCALING IMPROVEMENTS AND SUPER-RESOLUTION SIGNALLING

(71) Applicant: V-NOVA INTERNATIONAL LIMITED, London (GB)

(72) Inventors: Simone Ferrara, London (GB); Guido Meardi, London (GB)

(73) Assignee: V-Nova International Limited, London (GB)

( * ) Notice: Subject to any disclaimer, the term of this patent is extended or adjusted under 35 U.S.C. 154(b) by 58 days.

(21) Appl. No.: 17/766,117

(22) PCT Filed: Oct. 2, 2020

(86) PCT No.: PCT/GB2020/052420
§ 371 (c)(1),
(2) Date: Apr. 1, 2022

(87) PCT Pub. No.: WO2021/064413
PCT Pub. Date: Apr. 8, 2021

(65) Prior Publication Data
US 2022/0385911 A1    Dec. 1, 2022

Related U.S. Application Data

(60) Provisional application No. 62/984,261, filed on Mar. 2, 2020.

(30) Foreign Application Priority Data

Oct. 2, 2019   (GB) ........................... 1914215
Oct. 6, 2019   (GB) ........................... 1914414

(Continued)

(51) Int. Cl.
*H04N 19/00*   (2014.01)
*H04N 19/12*   (2014.01)
(Continued)

(52) U.S. Cl.
CPC ............. *H04N 19/86* (2014.11); *H04N 19/12* (2014.11); *H04N 19/124* (2014.11);
(Continued)

(58) Field of Classification Search
CPC ...... H04N 19/86; H04N 19/12; H04N 19/124; H04N 19/132; H04N 19/136;
(Continued)

(56) References Cited

U.S. PATENT DOCUMENTS

2014/0321555 A1* 10/2014 Rossato ................. H04N 19/88
375/240.26
2021/0127140 A1*  4/2021 Hannuksela ........... G06N 3/084

OTHER PUBLICATIONS

International Search Report and Written Opinion for PCT/GB2020/052420 mailed Feb. 2, 2021.
(Continued)

*Primary Examiner* — Zhihan Zhou
(74) *Attorney, Agent, or Firm* — Workman Nydegger

(57) ABSTRACT

Certain examples described herein relate to methods for encoding and decoding signals. Certain examples relate to the control of signal processing operations that are performed at a decoder. These may comprise optional signal processing operations to provide an enhanced output signal. For video signals, the enhanced output signal may comprise a so-called "super-resolution" signal, e.g. a signal with improved detail resolution as compared to a reference signal. Certain examples described herein provide signalling for enhancement operations, e.g. so-called super-resolution modes, within user data of one or more tier-based hierarchical encoding and decoding schemes. The user data may (Continued)

be embedded within values of an enhancement stream, e.g. replace one or more values for a predefined set of transformed coefficients, and/or within supplementary enhancement information messages. The user data may have a defined syntax including header and payload portions. The syntax may differ for different frames of data, e.g. for a video encoding, instantaneous decoding refresh picture frames may carry different information from non-instantaneous decoding refresh picture.

19 Claims, 13 Drawing Sheets

(30) Foreign Application Priority Data

| | | |
|---|---|---|
| Oct. 6, 2019 | (GB) | 1914416 |
| Oct. 25, 2019 | (GB) | 1915553 |
| Jan. 12, 2020 | (GB) | 2000430 |
| Jan. 31, 2020 | (GB) | 2001408 |
| Apr. 27, 2020 | (GB) | 2006183 |
| Jun. 30, 2020 | (GB) | 2010015 |

(51) Int. Cl.

| | |
|---|---|
| *H04N 19/124* | (2014.01) |
| *H04N 19/132* | (2014.01) |
| *H04N 19/136* | (2014.01) |
| *H04N 19/146* | (2014.01) |
| *H04N 19/154* | (2014.01) |
| *H04N 19/156* | (2014.01) |
| *H04N 19/159* | (2014.01) |
| *H04N 19/18* | (2014.01) |
| *H04N 19/184* | (2014.01) |
| *H04N 19/30* | (2014.01) |
| *H04N 19/34* | (2014.01) |
| *H04N 19/61* | (2014.01) |
| *H04N 19/70* | (2014.01) |
| *H04N 19/86* | (2014.01) |

(52) U.S. Cl.
CPC ......... *H04N 19/132* (2014.11); *H04N 19/136* (2014.11); *H04N 19/146* (2014.11); *H04N 19/154* (2014.11); *H04N 19/156* (2014.11); *H04N 19/159* (2014.11); *H04N 19/18* (2014.11); *H04N 19/184* (2014.11); *H04N 19/30* (2014.11); *H04N 19/34* (2014.11); *H04N 19/61* (2014.11); *H04N 19/70* (2014.11)

(58) Field of Classification Search
CPC .. H04N 19/154; H04N 19/156; H04N 19/159; H04N 19/18; H04N 19/184; H04N 19/30; H04N 19/34; H04N 19/46; H04N 19/61; H04N 19/70
See application file for complete search history.

(56) References Cited

OTHER PUBLICATIONS

"Working Draft of Low Complexity Enhancement Video Coding", 126. MPEG Meeting: Mar. 25, 2019-Mar. 29, 2019; Geneva, Motion Picture Expert Group or ISO/IEC JTC1/SC29/WG11), No. n18454, Apr. 18, 2019, XP030208724, retrieved from the internet: http://phenix.int-evry.fr/pmeg/doc_end_user/documents/126_Geneva/wo11/w18454.zipN18454.docx, retrieved on Apr. 18, 2019.

Damnjanovic I et al., "[LCEVC]—Proposed improved temporal signalling", 127, MPEG Meeting: Jul. 8, 2019-Jul. 12, 2019, Gothenburg, Motion Picture Expert Group or ISO/IEC JTC1/SC29/WG11, No. m49255, Jul. 6, 2019, XP030207548, retrieved from the internet: http://phenix.int-evry.fr/mpeg/doc_end_user/documents/127_Gothenburg/wg11/m49255-v2-m49255-[LCEVC]-Proposedimprovedtemporalsignalling-v.2.zip, m49255—LCEVC—Proposed improved temporal signalling—v.2.docx, retrieved on Jul. 6, 2019.

Cohen R et al., "Low Complexity Embedding of Information in Transform Coefficients", 5, JCT-VC Meeting; Mar. 16, 2011-Mar. 23, 2011, Geneva, Joint Collaborative Team on Video Coding of ISO/IEC JTC1/SC29/WG11 and ITU-T SG.16, No. JCTVC-E428, Mar. 21, 2011, XP030227766, retrieved from the internet: http:/phenix.int-evry.fr/jct/doc_end_user/documents/5_Geneva/wg11/JCTVC-E428-v3.zip, JCTVC-E428_r2.doc, retrieved on Mar. 21, 2011.

* cited by examiner

USE OF EMBEDDED SIGNALLING FOR BACKWARD-COMPATIBLE SCALING IMPROVEMENTS AND SUPER-RESOLUTION SIGNALLING

CROSS-REFERENCE TO RELATED APPLICATIONS

The present application is a 371 US Nationalization of International Patent Application No. PCT/GB2020/052420, filed Oct. 2, 2020, which claims priority to U.S. Patent Application No. 62/984,261, filed Mar. 2, 2020, and to UK Patent Application Nos: 1914215.7, filed Oct. 2, 2019, 1914416.1, filed Oct. 6, 2019, 1914414.6, filed Oct. 6, 2019, 1915553.0, filed Oct. 25, 2019, 2000430.5, filed Jan. 12, 2020, 2001408.0, filed Jan. 31, 2020, 2006183.4, filed Apr. 27, 2020, and 2010015.2, filed Jun. 30, 2020. The entire disclosures of the aforementioned applications are incorporated herein by reference.

TECHNICAL FIELD

The present invention relates to methods for processing signals, such as by way of non-limiting examples video, image, hyperspectral image, audio, point clouds, 3DoF/6DoF and volumetric signals. Processing data may include, but is not limited to, obtaining, deriving, encoding, outputting, receiving and reconstructing a signal in the context of a hierarchical (tier-based) coding format, where the signal is decoded in tiers at subsequently higher level of quality, leveraging and combining subsequent tiers ("echelons") of reconstruction data. Different tiers of the signal may be coded with different coding formats (e.g., by way of non-limiting examples, traditional single-layer DCT-based codecs, ISO/IEC MPEG-5 Part 2 Low Complexity Enhancement Video Coding SMPTE VC-6 2117, etc.), by means of different elementary streams that may or may not multiplexed in a single bitstream.

BACKGROUND

In tier-based coding formats such as ISO/IEC MPEG-5 Part 2 LCEVC (hereafter "LCEVC"), or SMPTE VC-6 2117 (hereafter "VC-6"), a signal is decomposed in multiple "echelons" (also known as "hierarchical tiers") of data, each corresponding to a "Level of Quality" ("LoQ") of the signal, from the highest echelon at the sampling rate of the original signal to a lowest echelon, which typically has a lower sampling rate than the original signal. In the non-limiting example when the signal is a frame of a video stream, the lowest echelon may be a thumbnail of the original frame, or even just a single picture element. Other echelons contain information on corrections to apply to a reconstructed rendition in order to produce the final output. Echelons may be based on residual information, e.g. a difference between a version of the original signal at a particular level of quality and a reconstructed version of the signal at the same level of quality. A lowest echelon may not comprise residual information but may comprise a lowest sampling of the original signal. The decoded signal at a given Level of Quality is reconstructed by first decoding the lowest echelon (thus reconstructing the signal at the first—lowest—Level of Quality), then predicting a rendition of the signal at the second—next higher—Level of Quality, then decoding the corresponding second echelon of reconstruction data (also known as "residual data" at the second Level of Quality), then combining the prediction with the reconstruction data so as to reconstruct the rendition of the signal at the second—higher—Level of Quality, and so on, up to reconstructing the given Level of Quality. Reconstructing the signal may comprise decoding residual data and using this to correct a version at a particular Level of Quality that is derived from a version of the signal from a lower Level of Quality. Different echelons of data may be coded using different coding formats, and different Levels of Quality may have different sampling rates (e.g., resolutions, for the case of image or video signals). Subsequent echelons may refer to a same signal resolution (i.e., sampling rate) of the signal, or to a progressively higher signal resolution.

U.S. Pat. No. 8,948,248 B2 discloses a decoder that decodes a first set of data. The first set of decoded data is used to reconstruct the signal according to a first level of quality. The decoder further decodes a second set of data and identifies an upsample operation specified by the second set of decoded data. The decoder applies the upsample operation identified in the second set of decoded data to the reconstructed signal at the first level of quality to reconstruct the signal at a second, higher level of quality. To enhance the reconstructed signal, the decoder retrieves residual data from the second set of decoded data. The residual data indicates how to modify the reconstructed signal at the second level of quality subsequent to application of the upsampling operation as discussed above. The decoder then modifies the reconstructed signal at the second level of quality as specified by the residual data.

In the proposal to the Joint Video Team of ISO/IEC MPEG & ITU-T VCEG (ISO/IEC JTC1/SC29/WG11 and ITU-T SG16 0.6—Document: JVT-R075 associated with the 18$^{th}$ Meeting in Bangkok Thailand on 14-20 Jan. 2006) a switched scalable video coding (SVC) up-sampling filter is described. In this proposal, different upsampling filters are selected based on one of a quantisation parameter (QP) threshold value that is signalled to the decoder or a rate-distortion value.

The paper "Sample Adaptive Offset in the HEVC Standard" by Chih-Ming Fu et al, published in the IEEE Transactions on Circuits and Systems for Video Technology, Vol. 22, No. 12, December 2012 describes the in-loop sample adaptive offset (SAO) adaptive filtering technique that is used in HEVC. Sample adaptive offset parameters for each coding tree unit (CTU) may be interleaved into slice data. The sample adaptive offset parameters may be adapted for each coding tree unit.

SUMMARY

Aspects and variations of the present invention are set out in the appended claims.

Certain unclaimed aspects are further set out in the detailed description below.

In one described aspect, a method of decoding a signal comprises obtaining an encoded data stream, the encoded data stream being encoded by an encoder according to a tier-based hierarchical format; parsing the encoded data stream to determine signal processing information signalled by the encoder; and reconstructing a higher resolution tier of the signal from a lower resolution tier of the signal, including selectively performing one or more signal processing operations to enhance the higher resolution tier based on the determined signal processing information. Following this method, the capabilities of a standardised tier-based hierarchical format may be flexibly extended to include more advanced signal processing operations, such as adaptive filters and neural network approaches.

In certain described examples, at least part of the data corresponding to the signal processing information is embedded in one or more values received in one or more encoded data layers transmitted within the stream of encoded data, wherein said values are associated with transformed coefficients that are processed to derive elements of the signal during the decoding. These may be values for a predefined transformed coefficient within a set of different transformed coefficients that are generated by an encoding transform (e.g. A, H, V and D values for a 2×2 Hadamard transform). Embedding signal processing information in this manner allows for said information to be advantageously compressed using standardised methods that are used for residual data values, such as run-length and prefix encoding (alternatively also referred to as Huffman coding). Embedded signal processing information in this manner also allows localised parameters that are associated with a particular coding unit or data block to be sent together with the transformed data values for the coding unit or data block. A transformed coefficient may be selected that has negligible effect on a reconstructed signal (such as H or HH coefficients). Furthermore, the absence of the transformed coefficient values at the start of a picture frame of video or an audio track is unlikely to be perceived.

In other or complementary examples, at least part of the data corresponding to the signal processing information is encoded within supplementary enhancement information (SEI) messages. SEI messages may provide an easy way to provide access to global signalling information in a manner that does not interfere with conventional processing according to a defined coding standard.

In yet another example, the signal processing information may be determined based at least in part on a set of predefined values for configuration data for the signal, the configuration data configuring one or more signal processing operations that are not the signal processing operations to enhance the higher resolution tier. In this manner, parameters for non-standard enhancements may be signalled using data fields as defined in a standardised signal coding approach.

In certain examples, the one or more signal processing operations are selectively performed prior to adding residual data for the higher resolution tier of the signal. This may be seen as "in-loop" enhancement. This may allow for the residual data to correct rare artifacts generated by the one or more signal processing operations. As such, less-than-perfect signal processing operations (e.g. that produce good results less than 100% of the time), which before were unusable as they occasionally degraded picture quality, become useable. In this case, one or more signal processing operations may be performed within a frame decoding loop for the tier-based hierarchical format.

In certain examples, the one or more signal processing operations provide a super-resolution signal, i.e. enhance an upsampling operation that provides improved detail as compared to comparative upsampling operations (e.g. at least those that copy a lower tier of data to multiple pixels in a higher tier of data). In certain examples, the one or more signal processing operations are implemented as part of an upsampling operation, the upsampling operation generating the higher resolution tier of the signal from the lower resolution tier of the signal.

In certain examples, selectively performing one or more signal processing operations to enhance the higher resolution tier comprises determining operating parameters for a decoder performing the decoding; responsive to a first set of operating parameters, performing the one or more signal processing operations to enhance the higher resolution tier using signal processing parameters within the determined signal processing information; and responsive to a second set of operating parameters, omitting the one or more signal processing operations. This allows signalled (optional) enhancement operations to be performed based on local decoder conditions. In one example, the method comprises: determining a resource use metric for a decoder performing the decoding; comparing the resource use metric to a resource use threshold; responsive to the comparing indicating an absence of a limitation on resource use for the decoder, performing the one or more signal processing operations to enhance the higher resolution tier based on the determined signal processing information; and responsive to the comparing indicating a limitation on resource use for the decoder, omitting the one or more signal processing operations during the reconstructing. For example, many enhancement operations are more resource intensive than comparative default or standard decoding methods; by applying these methods, they are applied only if the decoder has the resources available to apply them. This provides a simple implementation of a relatively complex adaptive enhancement system.

In one example, the method comprises: identifying a signal processing operation to enhance the higher resolution tier using the determined signal processing information; determining whether a decoder performing the decoding is capable of implementing the identified signal processing operation; responsive to the decoder not being capable of implementing the identified signal processing operation, ignoring the determined signal processing information; and responsive to the decoder being capable of implementing the identified signal processing operation, performing the determined signal processing operation as parameterised by the determined signal processing information. In this manner, backward compatibility may be maintained. For example, older legacy decoders that are constructed according to an extant decoding standard may ignore the signal processing information and still decode data according to the standard; whereas newer decoders may modularly implement newly available advances in signal enhancement whilst still being standard compliant. For example, different makes and model of decoder may implement different enhancement operations and these may be signalled and applied flexibly whilst maintaining compatibility with encoding and broadcasting systems.

In certain examples, the one or more signal processing operations comprise a sharpening filter that is applied in addition to an upsampling operation for the reconstructing, the upsampling operation generating the higher resolution tier of the signal from the lower resolution tier of the signal. In these examples, the determined signal processing information may indicate at least one coefficient value for an unsharp mask, and this coefficient value may be adapted to local content (or applying globally). In one example, the determined signal processing information indicates a central integer coefficient value for an unsharp mask. An unsharp mask may reduce a bit rate needed for residual data in higher tiers by providing an upsampled signal that is closer to an original signal. It may also provide improvements that improve viewability of a video signal even when residual data is unavailable (e.g. during network congestion and the like).

In one example, the one or more signal processing operations form part of a cascade of linear operations that are applied to data from the lower resolution tier of the signal.

The cascade of linear operations may comprise an addition of a predicted average modifier.

In certain examples, the one or more signal processing operations comprise a neural network upsampler. The neural network upsampler may be a small, efficient implementation that is capable of operating at real-time signal frame rates. The methods described herein allow flexible signalling of different neural network configurations, allowing in-use upgrades of decoder functionality. In one case, the determined signal processing information indicates coefficient values for one or more linear layers of a convolution neural network. In this case, the neural network may adaptively upsample coding units of a signal based on local context.

In certain examples, the one or more signal processing operations comprise an additional upsampling operation that is applied to an output of a last layer with residual data within the tier-based hierarchical format. For example, the methods described herein allow for both modifying standardised upsampling procedures and signalling the use of additional or "extra" upsampling that provides upscaling improvements.

In certain examples, the method comprises, after reconstructing a higher resolution tier, applying dithering to an output of the reconstructed higher resolution tier. It is advantageous to apply dithering to a higher resolution signal for best visual results. In the present case this may be achieved by switching enhancement operations below a standardised dithering operation.

In certain examples, the signal processing information comprises header data and payload data, and the method comprises: parsing a first set of values received in one or more encoded data layers to extract the header data; and parsing a second subsequent set of values received in one or more encoded data layers to extract the payload data. The signal processing information may thus be defined according to a shared syntax that may be applied to user data in both embedded transformed coefficients and SEI messages. This syntax may be expandable, by chaining additional non-enhancement user data before or after the described signal processing information, i.e. further user data may be embedded within a third set of values that follow the second set of values. In certain cases, the header data and the payload data may be split across different signalling approaches (e.g. header data may be sent by SEI message and payload data via embedded user data). The header data may be supplied to configure global aspects of signal processing, while localised (e.g., within frame) processing may be parameterised using the payload data. In certain examples, parsing of the second set of values is selectively performed depending on an enhancement mode identified in the header data, e.g. if no enhancement is specified the payload data may be ignored and/or omitted, allowing limited disruption to transformed coefficient processing. In certain examples, the embedded data is set as a series of n-bit values, e.g. 2-bit values, 6-bit values or 8-bit (byte) values. In certain examples, the signal comprises a video signal and a first header structure is used for an instantaneous decoding refresh (IDR) picture frame and a second header structure is used for a non-IDR picture frame, wherein the second header structure indicates whether there is a change to a configuration indicated in the first header structure. The signal processing information accompanying the IDR picture frame may thus be used to configure the enhancement operations for multiple future frames, wherein frame-by-frame adaptations may be signalled within non-IDR frames. In certain cases, the payload data for the non-IDR picture frame comprises values that instantiate the change from the configuration indicated in the first header structure. This may allow an efficient signalling of variable values.

In one set of examples, the signal processing information is embedded in one or more values received in an encoded data layer that provides transformed residual data for the lower resolution tier of the signal. For example, the signal processing information may be embedded within a level-1 encoded stream for LCEVC. This may be more reliably received (being of a smaller size due to the smaller resolution) and may allow for a longer time period to configure enhancement operations prior to the decoding of a level-2 encoded stream (the former being typically received before the latter).

In certain examples, one or more signal processing operations may be performed on data output by a frame decoding loop for the tier-based hierarchical format. This so-called "out-of-loop" enhancement may be advantageous when the enhancement may be performed on a fully reconstructed signal (e.g., advanced statistical dithering or approaches that use the information in the fully reconstructed signal, such as post-processing filters and "extra" upscaling).

In certain examples, the tier-based hierarchical format is one of MPEG-5 Part 2 LCEVC ("Low Complexity Enhancement Video Coding") and SMPTE VC-6 ST-2117.

A decoder may be configured to perform the method as described herein.

According to another described aspect, a method of encoding a signal is provided. The method comprises encoding a lower resolution tier of a tier-based hierarchical format; encoding a higher resolution tier of a tier-based hierarchical format, the higher resolution tier being encoded using data generated during the encoding of the lower resolution tier; and generating an encoded data stream using an output of the encoding of the lower resolution tier and an output of the encoding of the higher resolution tier; the method further comprising: determining signal processing information for one or more signal processing operations that are performed to enhance data within the higher resolution tier, the one or more signal processing operations being performed as part of a reconstruction of the higher resolution tier using the data generated during the encoding of the lower resolution tier; and encoding the signal processing information as part of the encoded data stream.

The above method thereby provides a complementary encoding method that may be performed at an encoder to generate the signal processing information that is parsed and determined in the decoding method. The one or more signal processing operations may form part of an encoder upsampling operation, and/or encoder post-processing following upsampling.

As in the decoding methods, in certain cases, the signal processing information replaces one or more quantized symbols of a predefined transformed coefficient within one or more of the lower resolution tier and the higher resolution tier, the predefined transformed coefficient comprising one of a plurality of transformed coefficients that are generated by transforming residual data within one or more of the lower resolution tier and the higher resolution tier. The signal processing information may replace one or more quantized symbols of a predefined transformed coefficient within the lower resolution tier. The one or more signal processing operations may comprise a set of optional signal processing operations including application of one or more of a sharpening filter and a convolutional neural network and/or a set of cascaded linear filters that upsample data from the lower resolution tier to the higher resolution tier, wherein the signal processing information comprises parameters for at least one of the set of cascaded linear filters.

An encoder may also be provided to perform this method of encoding.

Further features and advantages will become apparent from the following description, given by way of example only, which is made with reference to the accompanying drawings.

BRIEF DESCRIPTION OF THE DRAWINGS

FIGS. 12A and 11B show block diagrams of example neural network upsamplers;

DETAILED DESCRIPTION

Figure 1:
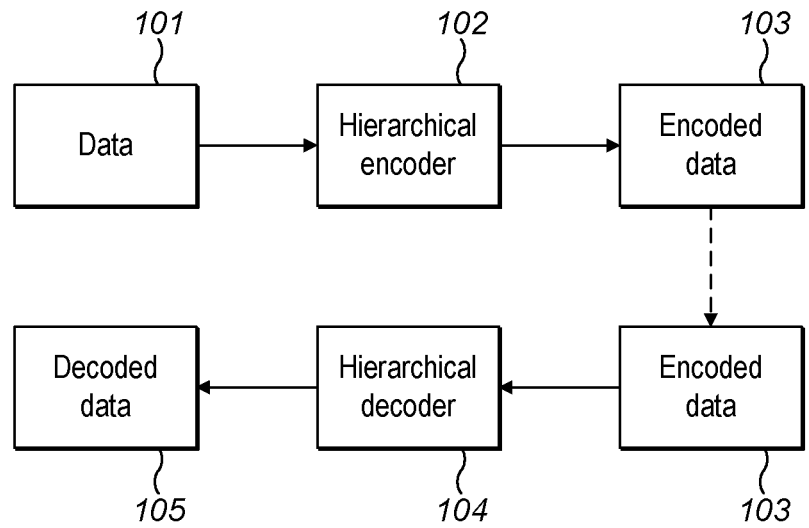
FIG. 1 shows a high-level schematic of a hierarchical encoding and decoding process.

Certain examples described herein relate to methods for encoding and decoding signals. Processing data may include, but is not limited to, obtaining, deriving, outputting, receiving and reconstructing data. The present examples relate to the control of signal processing operations that are performed at a decoder. These may comprise optional signal processing operations to provide an enhanced output signal. For video signals, the enhanced output signal may comprise a so-called "super-resolution" signal, e.g. a signal with improved detail resolution as compared to a reference signal. The reference signal may comprise an encoding of a video sequence at a first resolution and the enhanced output signal may comprise a decoded version of the video sequence at a second resolution, which is higher than the first resolution. The first resolution may comprise a native resolution for the video sequence, e.g. a resolution at which the video sequence is obtained for encoding.

Certain examples described herein provide signalling for enhancement operations, e.g. so-called super-resolution modes, within user data of one or more tier-based hierarchical encoding and decoding schemes. The user data may be embedded within values of an enhancement stream, e.g. replace one or more values for a predefined set of transformed coefficients, and/or within supplementary enhancement information messages. The user data may have a defined syntax including header and payload portions. The syntax may differ for different frames of data, e.g. for a video encoding, instantaneous decoding refresh picture frames may carry different information from non-instantaneous decoding refresh picture frames.

Introduction

Examples described herein relate to signal processing. A signal may be considered as a sequence of samples (i.e., two-dimensional images, video frames, video fields, sound frames, etc.). In the description, the terms "image", "picture" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, colour settings in a suitable colour space, settings indicating density levels, settings indicating temperature levels, settings indicating audio pitch, settings indicating amplitude, settings indicating depth, settings indicating alpha channel transparency level, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time, such as a video signal).

As examples, a signal can be an image, an audio signal, a multi-channel audio signal, a telemetry signal, a video signal, a 3DoF/6DoF video signal, a volumetric signal (e.g., medical imaging, scientific imaging, holographic imaging, etc.), a volumetric video signal, or even signals with more than four dimensions.

For simplicity, examples described herein often refer to signals that are displayed as 2D planes of settings (e.g., 2D images in a suitable colour space), such as for instance a video signal. The terms "frame" or "field" will be used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of embodiments illustrated herein on image and video signals, people skilled in the art can easily understand that the same concepts and methods are also applicable to any other types of multidimensional signal (e.g., audio signals, volumetric signals, stereoscopic video signals, 3DoF/6DoF video signals, plenoptic signals, point clouds, etc.).

Certain tier-based hierarchical formats described herein use a varying amount of correction (e.g., in the form of also "residual data", or simply "residuals") in order to generate a reconstruction of the signal at the given level of quality that best resembles (or even losslessly reconstructs) the original. The amount of correction may be based on a fidelity of a predicted rendition of a given level of quality.

In order to achieve a high-fidelity reconstruction, coding methods may upsample a lower resolution reconstruction of the signal to the next higher resolution reconstruction of the signal. In certain case, different signals may be best processed with different methods, i.e., a same method may not be optimal for all signals.

In addition, it has been determined that non-linear methods may be more effective than more conventional linear kernels (especially separable ones), but at the cost of increased processing power requirements. For the most part, due to processing power limitations, so far linear upsampling kernels of various sizes have been used (e.g., bilinear, bicubic, multi-lobe Lanczos, etc.), but more recently even more sophisticated non-linear techniques, such as the use of convolutional neural networks in VC-6, have been shown to produce higher quality preliminary reconstructions, thus reducing the entropy of residual data to be added for a high-fidelity final reconstruction.

In formats such as LCEVC, it is possible to signal to the decoder the coefficients of the upsampling kernel to be used before LCEVC's non-linear addition of "predicted residuals". At the same time, it is proposed to extend capabilities of the coding standard to embed in the coded stream reconstruction metadata that is ignored by unaware decoder, but that is processed by decoders that are capable to decode said user data.

In certain examples, signalling of signal processing information is performed by way of one or more of embedded transformed coefficient values, supplementary enhancement information (SEI) messages, and custom configuration settings. In this manner, signalling is optional and backward compatibility is maintained (e.g. decoders that conform to the LCEVC or VC-6 standard but that cannot implement the additional signal processing may simply ignore the additional signalling and decode as per usual).

Example methods describe herein leverage user data to transmit to the decoder information on more sophisticated scaling operations to be performed by decoders able to decode the user data and in possession of sufficient computing and/or battery power resources to perform the more sophisticated signal reconstruction tasks.

Certain examples described herein allow efficient generation, signalling and decoding of optional enhanced-upsampling-method information (signal processing information) that may be used by the decoder—along with residual data—to suitably amend the signal reconstruction in order to improve the quality of the reconstructed signal. In a set of described examples, this information is efficiently embedded in the coefficients of residual data for one or more echelons of the coded signal, allowing to avoid the need for additional signalling overhead as well as to efficiently discriminate the signals that can benefit from a range of quality-enhancement operations. In addition, the signal processing operations may be optional, and decoders unable to decode the user data or characterized by more stringent processing constraints will still be able to decode the signal, just with a lower quality rendition due to less optimal upsampling. This then maintains backward capability (e.g., the proposed methods herein compliment rather than "break" existing defined coding standards).

In certain examples described herein include the optional signal processing operations include sharpening filters such as unsharp masking or modified unsharp masking. The use and intensity of these filters may be signalled. These sharpening filters may be used in cascade after standard separable upsampling, either before applying residuals (i.e., in-loop) or after applying residuals (i.e., out-of-loop). In some examples, the use of sharpening kernels is associated with a modification of the coefficients of the linear upsampling kernel, in order to reduce ringing impairments while maintaining sharper edge reconstruction.

In certain examples described herein include the optional signal processing operations include neural network upsampling. For example, methods may include signalling the use for upsampling—instead of a conventional separable upsampling filter—of a super-resolution simplified convolutional neural network ("minConv"), whose topology is known to both encoder and decoder. In certain examples, the user data signalling includes values that allow the decoder to configure the coefficients of the neural network, better customizing the upsampling to the specific signal. In certain implementations with LCEVC, the use of the simplified convolutional neural network for upsampling is signalled to an "aware" decoder. When detecting such signalling, the decoder—in certain cases, if possessing sufficient processing resources—executes upsampling by means of the simplified convolutional neural network instead of using the typical separable upsampling filter. The enhanced upsampling is then followed by the addition of predicted residuals.

Examples of a Tier-Based Hierarchical Coding Scheme or Format

In preferred examples, the encoders or decoders are part of a tier-based hierarchical coding scheme or format. Examples of a tier-based hierarchical coding scheme include LCEVC: MPEG-5 Part 2 LCEVC ("Low Complexity Enhancement Video Coding") and VC-6: SMPTE VC-6 ST-2117, the former being described in PCT/GB2020/050695 (and the associated standard document) and the latter being described in PCT/GB2018/053552 (and the associated standard document), all of which are incorporated by reference herein. However, the concepts illustrated herein need not be limited to these specific hierarchical coding schemes.

Figure 4:
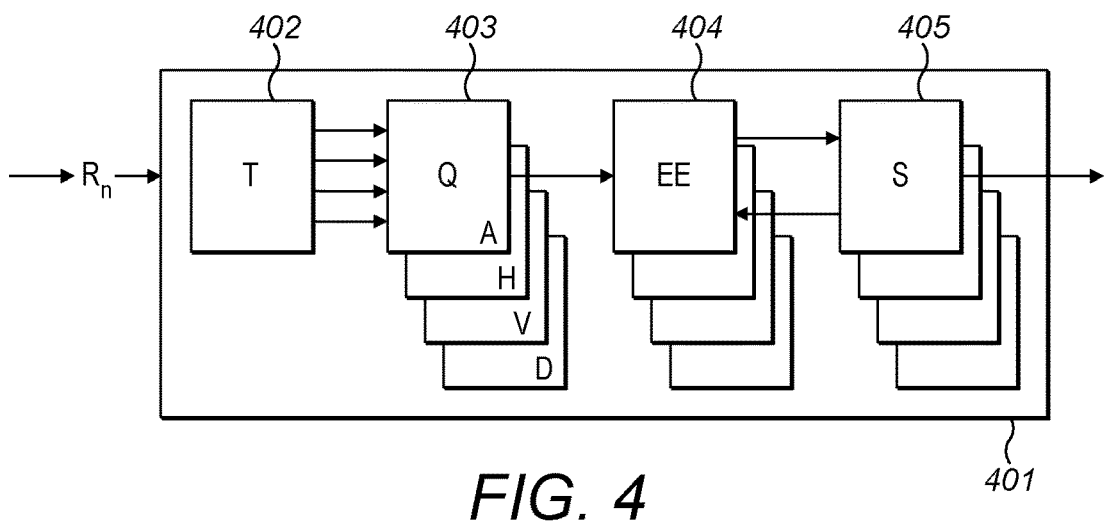
FIG. 4 shows a high-level schematic of an encoding process suitable for encoding the residuals of tiered outputs.
Figure 5:
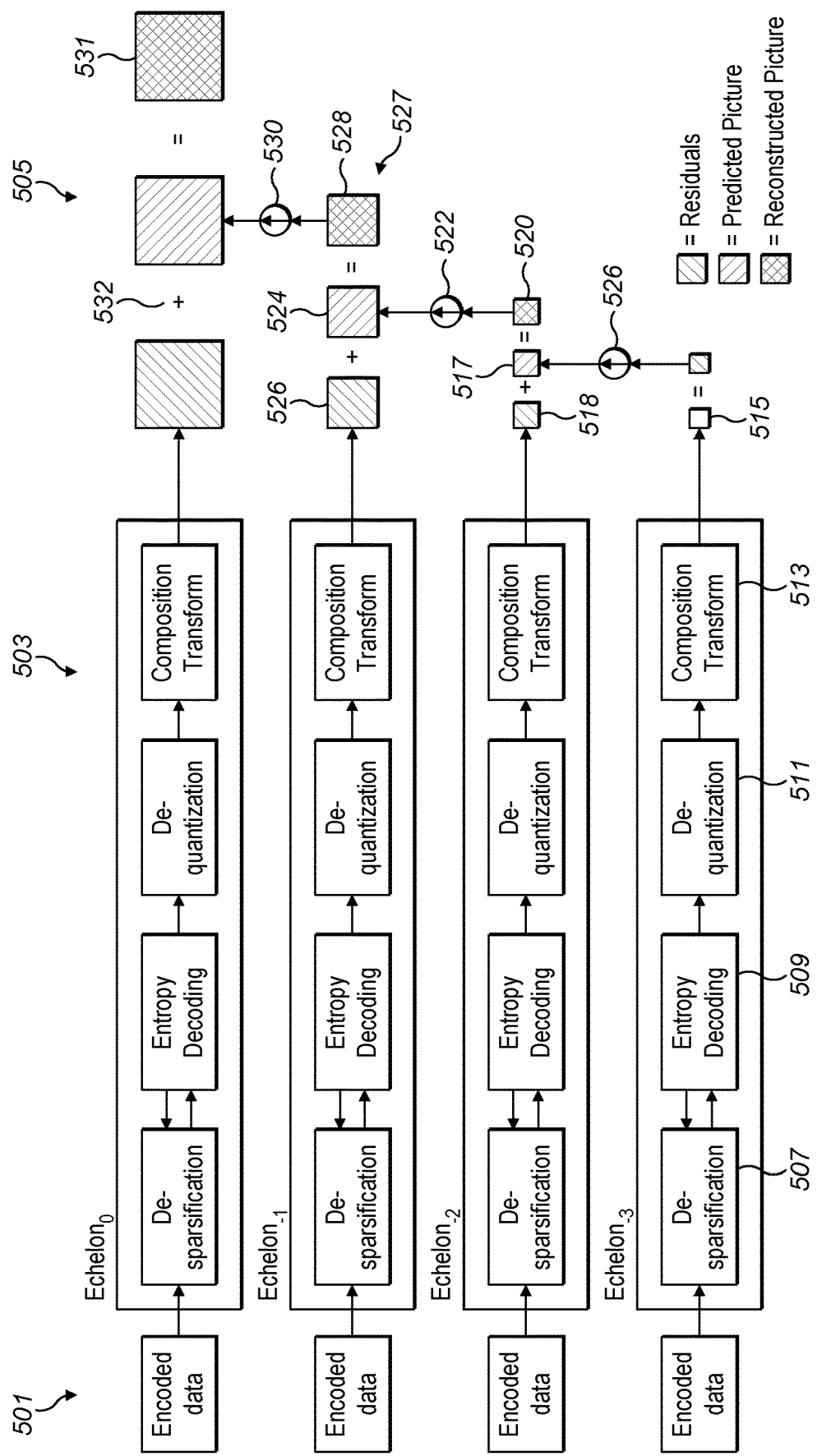
FIG. 5 shows a high-level schematic of a hierarchical decoding process suitable for decoding each output level from FIG. 4.
Figure 6:
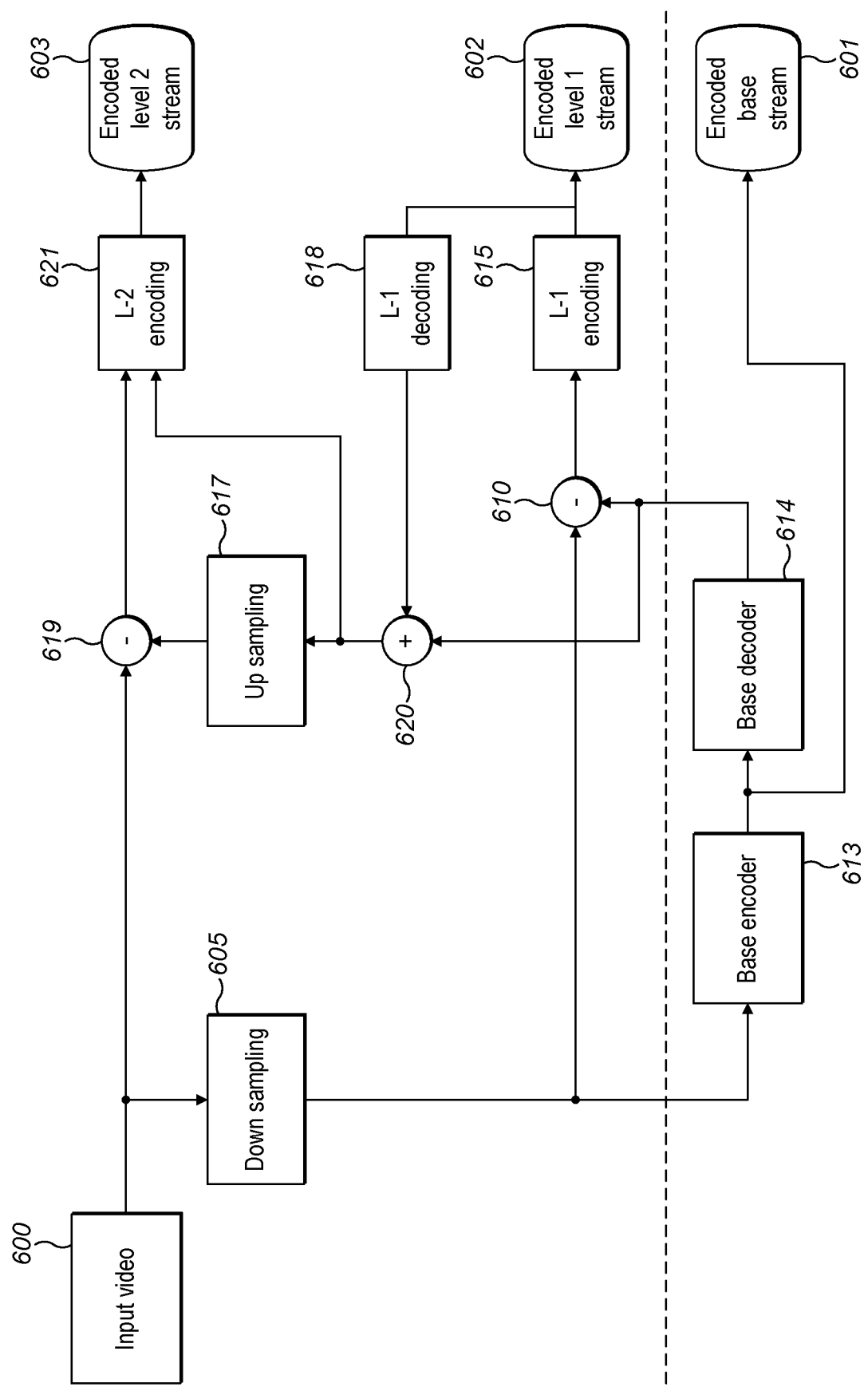
FIG. 6 shows a high-level schematic of an encoding process of a hierarchical coding technology; and, FIG. 7 shows a high-level schematic of a decoding process suitable for decoding the output of FIG. 6.
Figure 7:
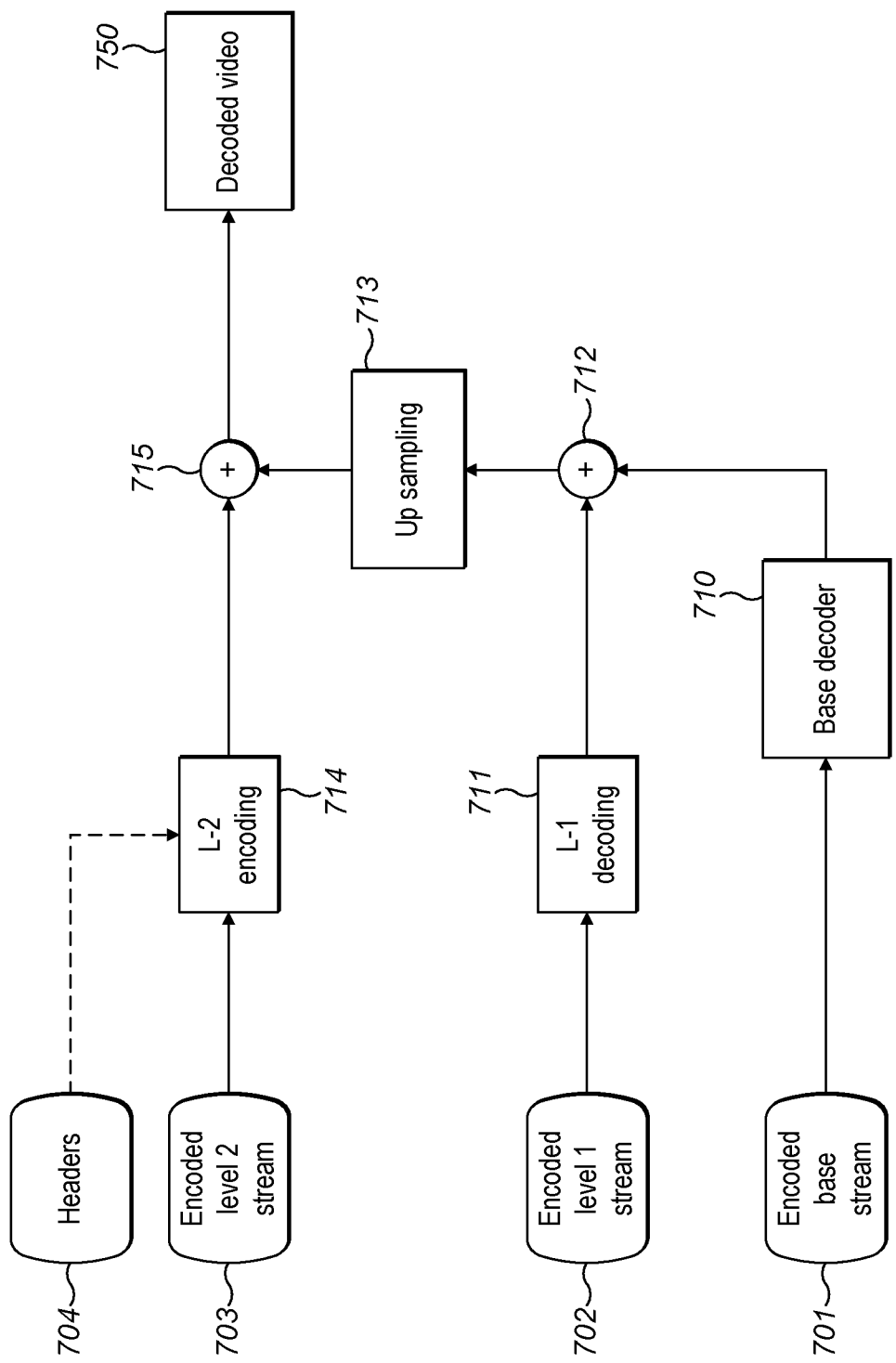

FIGS. 1 to 7 provide an overview of different example tier-based hierarchical coding formats. These are provided as context for the addition of further signal processing operations, which are set out in the Figures following FIG. 7. FIGS. 1 to 5 provide examples similar to the implementation of SMPTE VC-6 ST-2117, whereas FIGS. 6 and 7 provide examples similar to the implementation of MPEG-5 Part 2 LCEVC. It may be seen that both sets of examples utilise common underlying operations (e.g., downsampling, upsampling and residual generation) and may share modular implementing technologies.

FIG. 1 illustrates, very generally, a hierarchical coding scheme. Data to be encoded 101 is retrieved by a hierarchical encoder 102 which outputs encoded data 103. Subsequently, the encoded data 103 is received by a hierarchical decoder 104 which decodes the data and outputs decoded data 105.

Typically, the hierarchical coding schemes used in examples herein create a base or core level, which is a representation of the original data at a lower level of quality and one or more levels of residuals which can be used to recreate the original data at a higher level of quality using a decoded version of the base level data. In general, the term "residuals" as used herein refers to a difference between a value of a reference array or reference frame and an actual array or frame of data. The array may be a one or two-dimensional array that represents a coding unit. For example, a coding unit may be a 2×2 or 4×4 set of residual values that correspond to similar sized areas of an input video frame.

It should be noted that the generalised examples are agnostic as to the nature of the input signal. Reference to "residual data" as used herein refers to data derived from a set of residuals, e.g. a set of residuals themselves or an output of a set of data processing operations that are performed on the set of residuals. Throughout the present description, generally a set of residuals includes a plurality of residuals or residual elements, each residual or residual element corresponding to a signal element, that is, an element of the signal or original data.

In specific examples, the data may be an image or video. In these examples, the set of residuals corresponds to an image or frame of the video, with each residual being associated with a pixel of the signal, the pixel being the signal element.

The methods described herein may be applied to so-called planes of data that reflect different colour components of a video signal. For example, the methods may be applied to different planes of YUV or RGB data reflecting different colour channels. Different colour channels may be processed in parallel. The components of each stream may be collated in any logical order.

A hierarchical coding scheme will now be described in which the concepts of the invention may be deployed. The scheme is conceptually illustrated in FIGS. 2 to 5 and corresponds generally to VC-6 described above. In such encoding techniques, residuals data is used in progressively higher levels of quality. In this proposed technique, a core layer represents the image at a first resolution and subsequent layers in the tiered hierarchy are residual data or adjustment layers necessary for the decoding side to reconstruct the image at a higher resolution. Each layer or level may be referred to as an echelon index, such that the residuals data is data required to correct low quality information present in a lower echelon index. Each layer or echelon index in this hierarchical technique, particularly each residual layer, is often a comparatively sparse data set having many zero value elements. When reference is made to an echelon index, it refers collectively to all echelons or sets of components at that level, for example, all subsets arising from a transform step performed at that level of quality.

In this particular hierarchical manner, the described data structure removes any requirement for, or dependency on, the preceding or proceeding level of quality. A level of quality may be encoded and decoded separately, and without reference to any other layer. Thus, in contrast to many known other hierarchical encoding schemes, where there is a requirement to decode the lowest level of quality in order to decode any higher levels of quality, the described methodology does not require the decoding of any other layer. Nevertheless, the principles of exchanging information described below may also be applicable to other hierarchical coding schemes.

Figure 2:
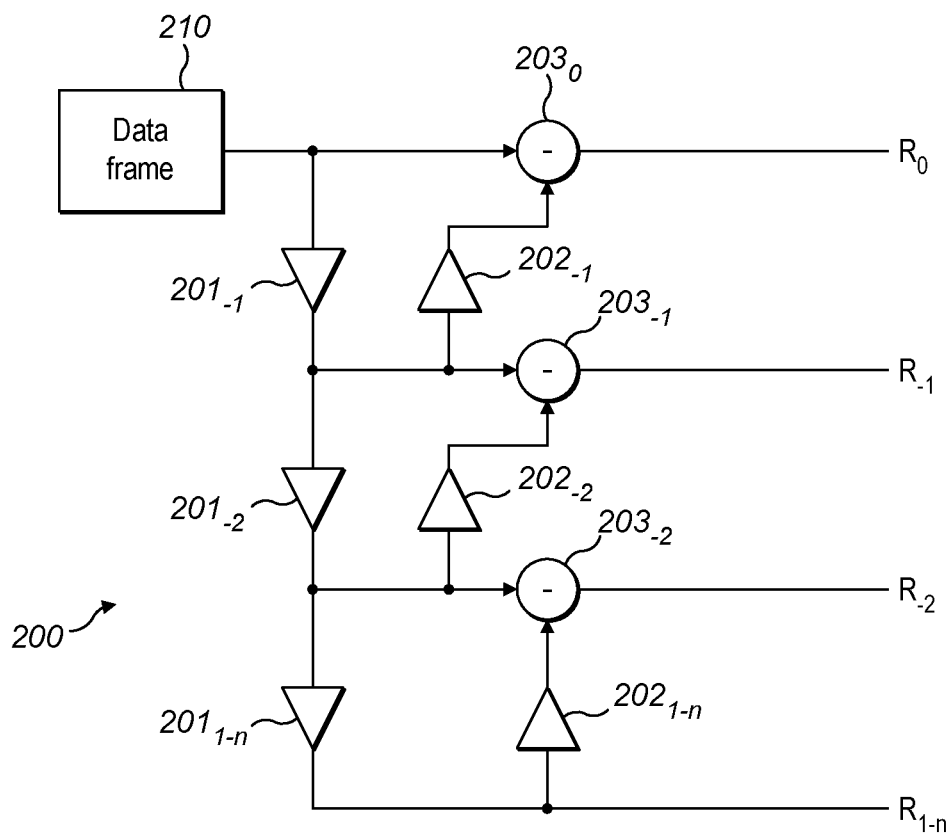
FIG. 2 shows a high-level schematic of a hierarchical deconstruction process.

As shown in FIG. 2, the encoded data represents a set of layers or levels, generally referred to here as echelon indices. The base or core level represents the original data frame 210, albeit at the lowest level of quality or resolution and the subsequent residuals data echelons can combine with the data at the core echelon index to recreate the original image at progressively higher resolutions.

To create the core-echelon index, an input data frame 210 may be down-sampled using a number of down-sampling operations 201 corresponding to the number of levels or echelon indices to be used in the hierarchical coding operation. One fewer down-sampling operation 201 is required than the number of levels in the hierarchy. In all examples illustrated herein, there are 4 levels or echelon indices of output encoded data and accordingly 3 down-sampling operations, but it will of course be understood that these are merely for illustration. Where n indicates the number of levels, the number of down-samplers is n−1. The core level $R_{1\text{-}n}$ is the output of the third down-sampling operation. As indicated above, the core level $R_{1\text{-}n}$ corresponds to a representation of the input data frame at a lowest level of quality.

To distinguish between down-sampling operations 201, each will be referred to in the order in which the operation is performed on the input data 210 or by the data which its output represents. For example, the third down-sampling operation $201_{1\text{-}n}$ in the example may also be referred to as the core down-sampler as its output generates the core-echelon index or echelon$_{1\text{-}n}$, that is, the index of all echelons at this level is 1−n. Thus, in this example, the first down-sampling operation $201_{-1}$ corresponds to the $R_{-1}$ down-sampler, the second down-sampling operation $201_{-2}$ corresponds to the $R_{-2}$ down-sampler and the third down-sampling operation $201_{1\text{-}n}$ corresponds to the core or $R_{-3}$ down-sampler.

As shown in FIG. 2, the data representing the core level of quality $R_{1\text{-}n}$ undergoes an up-sampling operation $202_{1\text{-}n}$, referred to here as the core up-sampler. A difference $203_{-2}$ between the output of the second down-sampling operation $201_{-2}$ (the output of the $R_{-2}$ down-sampler, i.e. the input to the core down-sampler) and the output of the core up-sampler $202_{1\text{-}n}$ is output as the first residuals data $R_{-2}$. This first residuals data $R_{-2}$ is accordingly representative of the error between the core level $R_{-3}$ and the signal that was used to create that level. Since that signal has itself undergone two down-sampling operations in this example, the first residuals data $R_{-2}$ is an adjustment layer which can be used to recreate the original signal at a higher level of quality than the core level of quality but a lower level than the input data frame 210.

Figure 3:
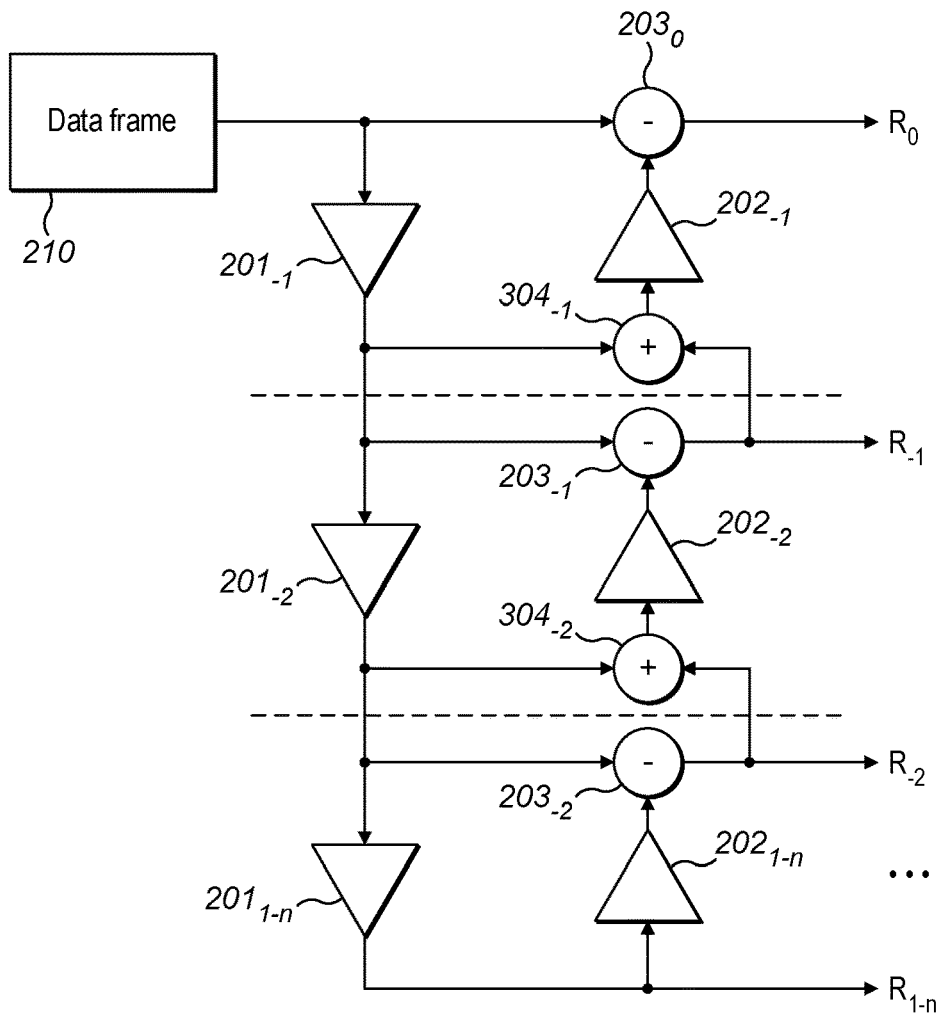
FIG. 3 shows an alternative high-level schematic of a hierarchical deconstruction process.

Variations in how to create residuals data representing higher levels of quality are conceptually illustrated in FIGS. 2 and 3.

In FIG. 2, the output of the second down-sampling operation $201_{-2}$ (or $R_{-2}$ down-sampler, i.e. the signal used to create the first residuals data $R_{-2}$), is up-sampled $202_{-2}$ and the difference $203_{-1}$ between the input to the second down-sampling operation $201_{-2}$ (or $R_{-2}$ down-sampler, i.e. the output of the $R_{-1}$ down-sampler) is calculated in much the same way as the first residuals data $R_{-2}$ is created. This difference is accordingly the second residuals data $R_{-1}$ and represents an adjustment layer which can be used to recreate the original signal at a higher level of quality using the data from the lower layers.

In the variation of FIG. 3, however, the output of the second down-sampling operation $201_{-2}$ (or $R_{-2}$ down-sampler) is combined or summed $304_{-2}$ with the first residuals data $R_{-2}$ to recreate the output of the core up-sampler $202_{1\text{-}n}$. In this variation it is this recreated data which is up-sampled $202_{-2}$ rather than the down-sampled data. The up-sampled data is similarly compared $203_{-1}$ to the input to the second down-sampling operation (or $R_{-2}$ down-sampler, i.e. the output of the $R_{-1}$ down-sampler) to create the second residuals data $R_{-1}$.

The variation between the implementations of FIGS. 2 and 3 results in slight variations in the residuals data between the two implementations. FIG. 2 benefits from greater potential for parallelisation.

The process or cycle repeats to create the third residuals $R_0$. In the examples of FIGS. 2 and 3, the output residuals data $R_0$ (i.e. the third residuals data) corresponds to the highest level and is used at the decoder to recreate the input data frame. At this level the difference operation is based on the input data frame which is the same as the input to the first down-sampling operation.

FIG. 4 illustrates an example encoding process 401 for encoding each of the levels or echelon indices of data to produce a set of encoded echelons of data having an echelon index. This encoding process is used merely for example of a suitable encoding process for encoding each of the levels, but it will be understood that any suitable encoding process may be used. The input to the process is a respective level of residuals data output from FIG. 2 or 3 and the output is a set of echelons of encoded residuals data, the echelons of encoded residuals data together hierarchically represent the encoded data.

In a first step, a transform 402 is performed. The transform may be directional decomposition transform as described in WO2013/171173 or a wavelet or discrete cosine transform. If a directional decomposition transform is used, there may be output a set of four components (also referred to as transformed coefficients). When reference is made to an echelon index, it refers collectively to all directions (A, H, V, D), i.e., 4 echelons. The component set is then quantized 403 before entropy encoding. In this example, the entropy encoding operation 404 is coupled to a sparsification step 405 which takes advantage of the sparseness of the residuals data to reduce the overall data size and involves mapping data elements to an ordered quadtree. Such coupling of entropy coding and sparsification is described further in WO2019/111004 but the precise details of such a process is not relevant to the understanding of the invention. Each array of residuals may be thought of as an echelon.

The process set out above corresponds to an encoding process suitable for encoding data for reconstruction according to SMPTE ST 2117, VC-6 Multiplanar Picture Format. VC-6 is a flexible, multi-resolution, intra-only bitstream format, capable of compressing any ordered set of integer element grids, each of independent size but is also designed for picture compression. It employs data agnostic techniques for compression and is capable of compressing low or high bit-depth pictures. The bitstream's headers can contain a variety of metadata about the picture.

As will be understood, each echelon or echelon index may be implemented using a separate encoder or encoding operation. Similarly, an encoding module may be divided into the steps of down-sampling and comparing, to produce the residuals data, and subsequently encoding the residuals or alternatively each of the steps of the echelon may be implemented in a combined encoding module. Thus, the process may be for example be implemented using 4 encoders, one for each echelon index, 1 encoder and a plurality of encoding modules operating in parallel or series, or one encoder operating on different data sets repeatedly.

The following sets out an example of reconstructing an original data frame, the data frame having been encoded using the above exemplary process. This reconstruction process may be referred to as pyramidal reconstruction. Advantageously, the method provides an efficient technique for reconstructing an image encoded in a received set of data, which may be received by way of a data stream, for example, by way of individually decoding different component sets corresponding to different image size or resolution levels, and combining the image detail from one decoded component set with the upscaled decoded image data from a lower-resolution component set. Thus by performing this process for two or more component sets, digital images at the structure or detail therein may be reconstructed for progressively higher resolutions or greater numbers of pixels, without requiring the full or complete image detail of the highest-resolution component set to be received. Rather, the method facilitates the progressive addition of increasingly higher-resolution details while reconstructing an image from a lower-resolution component set, in a staged manner.

Moreover, the decoding of each component set separately facilitates the parallel processing of received component sets, thus improving reconstruction speed and efficiency in implementations wherein a plurality of processes is available.

Each resolution level corresponds to a level of quality or echelon index. This is a collective term, associated with a plane (in this example a representation of a grid of integer value elements) that describes all new inputs or received component sets, and the output reconstructed image for a cycle of index-m. The reconstructed image in echelon index zero, for instance, is the output of the final cycle of pyramidal reconstruction.

Pyramidal reconstruction may be a process of reconstructing an inverted pyramid starting from the initial echelon index and using cycles by new residuals to derive higher echelon indices up to the maximum quality, quality zero, at echelon index zero. A cycle may be thought of as a step in such pyramidal reconstruction, the step being identified by an index-m. The step typically comprises up-sampling data output from a possible previous step, for instance, upscaling the decoded first component set, and takes new residual data as further inputs in order to obtain output data to be up-sampled in a possible following step. Where only first and second component sets are received, the number of echelon indices will be two, and no possible following step is present. However, in examples where the number of component sets, or echelon indices, is three or greater, then the output data may be progressively upsampled in the following steps.

The first component set typically corresponds to the initial echelon index, which may be denoted by echelon index 1-N, where N is the number of echelon indices in the plane.

Typically, the upscaling of the decoded first component set comprises applying an upsampler to the output of the decoding procedure for the initial echelon index. In examples, this involves bringing the resolution of a reconstructed picture output from the decoding of the initial echelon index component set into conformity with the resolution of the second component set, corresponding to 2-N. Typically, the upscaled output from the lower echelon index component set corresponds to a predicted image at the higher echelon index resolution. Owing to the lower-resolution initial echelon index image and the up-sampling process, the predicted image typically corresponds to a smoothed or blurred picture.

Adding to this predicted picture higher-resolution details from the echelon index above provides a combined, reconstructed image set. Advantageously, where the received component sets for one or more higher-echelon index component sets comprise residual image data, or data indicating the pixel value differences between upscaled predicted pictures and original, uncompressed, or pre-encoding images, the amount of received data required in order to reconstruct an image or data set of a given resolution or quality may be considerably less than the amount or rate of data that would be required in order to receive the same quality image using other techniques. Thus, by combining low-detail image data received at lower resolutions with progressively greater-detail image data received at increasingly higher resolutions in accordance with the method, data rate requirements are reduced.

Typically, the set of encoded data comprises one or more further component sets, wherein each of the one or more further component sets corresponds to a higher image resolution than the second component set, and wherein each of the one or more further component sets corresponds to a progressively higher image resolution, the method comprising, for each of the one or more further component sets, decoding the component set so as to obtain a decoded set, the method further comprising, for each of the one or more further component sets, in ascending order of corresponding image resolution: upscaling the reconstructed set having the highest corresponding image resolution so as to increase the corresponding image resolution of the reconstructed set to be equal to the corresponding image resolution of the further component set, and combining the reconstructed set and the further component set together so as to produce a further reconstructed set.

In this way, the method may involve taking the reconstructed image output of a given component set level or echelon index, upscaling that reconstructed set, and combining it with the decoded output of the component set or echelon index above, to produce a new, higher resolution reconstructed picture. It will be understood that this may be performed repeatedly, for progressively higher echelon indices, depending on the total number of component sets in the received set.

In typical examples, each of the component sets corresponds to a progressively higher image resolution, wherein each progressively higher image resolution corresponds to a factor-of-four increase in the number of pixels in a corresponding image. Typically, therefore, the image size corresponding to a given component set is four times the size or number of pixels, or double the height and double the width, of the image corresponding to the component set below, that is the component set with the echelon index one less than the echelon index in question. A received set of component sets in which the linear size of each corresponding image is double with respect to the image size below may facilitate more simple upscaling operations, for example.

In the illustrated example, the number of further component sets is two. Thus, the total number of component sets in the received set is four. This corresponds to the initial echelon index being echelon−3.

The first component set may correspond to image data, and the second and any further component sets correspond to residual image data. As noted above, the method provides particularly advantageous data rate requirement reductions for a given image size in cases where the lowest echelon index, that is the first component set, contains a low resolution, or down sampled, version of the image being transmitted. In this way, with each cycle of reconstruction, starting with a low resolution image, that image is upscaled so as to produce a high resolution albeit smoothed version, and that image is then improved by way of adding the differences between that upscaled predicted picture and the actual image to be transmitted at that resolution, and this additive improvement may be repeated for each cycle. Therefore, each component set above that of the initial echelon index needs only contain residual data in order to reintroduce the information that may have been lost in down sampling the original image to the lowest echelon index.

The method provides a way of obtaining image data, which may be residual data, upon receipt of a set containing data that has been compressed, for example, by way of decomposition, quantization, entropy-encoding, and sparsification, for instance. The sparsification step is particularly advantageous when used in connection with sets for which the original or pre-transmission data was sparse, which may typically correspond to residual image data. A residual may be a difference between elements of a first image and elements of a second image, typically co-located. Such residual image data may typically have a high degree of sparseness. This may be thought of as corresponding to an image wherein areas of detail are sparsely distributed amongst areas in which details are minimal, negligible, or absent. Such sparse data may be described as an array of data wherein the data are organised in at least a two-dimensional structure (e.g., a grid), and wherein a large portion of the data so organised are zero (logically or numerically) or are considered to be below a certain threshold. Residual data are just one example. Additionally, metadata may be sparse and so be reduced in size to a significant degree by this process. Sending data that has been sparsified allows a significant reduction in required data rate to be achieved by way of omitting to send such sparse areas, and instead reintroducing them at appropriate locations within a received byteset at a decoder.

Typically, the entropy-decoding, de-quantizing, and directional composition transform steps are performed in accordance with parameters defined by an encoder or a node from which the received set of encoded data is sent. For each echelon index, or component set, the steps serve to decode image data so as to arrive at a set which may be combined with different echelon indices as per the technique disclosed above, while allowing the set for each level to be transmitted in a data-efficient manner.

There may also be provided a method of reconstructing a set of encoded data according to the method disclosed above, wherein the decoding of each of the first and second component sets is performed according to the method disclosed above. Thus, the advantageous decoding method of the present disclosure may be utilised for each component set or echelon index in a received set of image data and reconstructed accordingly.

With reference to FIG. 5, a decoding example is now described. A set of encoded data 501 is received, wherein the set comprises four echelon indices, each echelon index comprising four echelons: from $echelon_0$, the highest resolution or level of quality, to $echelon_{-3}$, the initial echelon. The image data carried in the $echelon_{-3}$ component set corresponds to image data, and the other component sets contain residual data for that transmitted image. While each of the levels may output data that can be considered as residuals, the residuals in the initial echelon level, that is $echelon_{-3}$, effectively correspond to the actual reconstructed image. At stage 503, each of the component sets is processed in parallel so as to decode that encoded set.

With reference to the initial echelon index, or the core-echelon index, the following decoding steps are carried out for each component set $echelon_{-3}$ to $echelon_0$.

At step 507, the component set is de-sparsified. De-sparsification may be an optional step that is not performed in other tier-based hierarchical formats. In this example, the de-sparsification causes a sparse two-dimensional array to be recreated from the encoded byteset received at each echelon. Zero values grouped at locations within the two-dimensional array which were not received (owing to there being omitted from the transmitted byteset in order to reduce the quantity of data transmitted) are repopulated by this process. Non-zero values in the array retain their correct values and positions within the recreated two-dimensional array, with the de-sparsification step repopulating the transmitted zero values at the appropriate locations or groups of locations there between.

At step 509, a range decoder, the configured parameters of which correspond to those using which the transmitted data was encoded prior to transmission, is applied to the de-sparsified set at each echelon in order to substitute the encoded symbols within the array with pixel values. The encoded symbols in the received set are substituted for pixel values in accordance with an approximation of the pixel value distribution for the image. The use of an approximation of the distribution, that is relative frequency of each value across all pixel values in the image, rather than the true distribution, permits a reduction in the amount of data required to decode the set, since the distribution information is required by the range decoder in order to carry out this step. As described in the present disclosure, the steps of de-sparsification and range decoding are interdependent, rather than sequential. This is indicated by the loop formed by the arrows in the flow diagram.

At step 511, the array of values is de-quantized. This process is again carried out in accordance with the parameters with which the decomposed image was quantized prior to transmission.

Following de-quantization, the set is transformed at step 513 by a composition transform which comprises applying an inverse directional decomposition operation to the de-quantized array. This causes the directional filtering, according to an operator set comprising average, horizontal, vertical, and diagonal operators, to be reversed, such that the resultant array is image data for $echelon_{-3}$ and residual data for $echelon_{-2}$ to $echelon_0$.

Stage 505 illustrates the several cycles involved in the reconstruction utilising the output of the composition transform for each of the echelon component sets 501. Stage 515 indicates the reconstructed image data output from the decoder 503 for the initial echelon. In an example, the reconstructed picture 515 has a resolution of 64×64. At 516, this reconstructed picture is up-sampled so as to increase its constituent number of pixels by a factor of four, thereby a predicted picture 517 having a resolution of 128×128 is produced. At stage 520, the predicted picture 517 is added to the decoded residuals 518 from the output of the decoder at $echelon_{-2}$. The addition of these two 128×128-size images produces a 128×128-size reconstructed image, containing the smoothed image detail from the initial echelon enhanced by the higher-resolution detail of the residuals from $echelon_{-2}$. This resultant reconstructed picture 519 may be output or displayed if the required output resolution is that corresponding to $echelon_{-2}$. In the present example, the reconstructed picture 519 is used for a further cycle. At step 512, the reconstructed image 519 is up-sampled in the same manner as at step 516, so as to produce a 256×256-size predicted picture 524. This is then combined at step 528 with the decoded $echelon_{-1}$ output 526, thereby producing a 256×256-size reconstructed picture 527 which is an upscaled version of prediction 519 enhanced with the higher-resolution details of residuals 526. At 530 this process is repeated a final time, and the reconstructed picture 527 is upscaled to a resolution of 512×512, for combination with the echelon0 residual at stage 532. Thereby a 512×512 reconstructed picture 531 is obtained.

A further hierarchical coding technology with which the principles of the present invention may be utilised is illustrated in FIGS. 6 and 7. This technology is a flexible, adaptable, highly efficient and computationally inexpensive coding format which combines a different video coding format, a base codec, (e.g., AVC, HEVC, or any other present or future codec) with at least two enhancement levels of coded data.

The general structure of the encoding scheme uses a down-sampled source signal encoded with a base codec, adds a first level of correction data to the decoded output of the base codec to generate a corrected picture, and then adds a further level of enhancement data to an up-sampled version of the corrected picture. Thus, the streams are considered to be a base stream and an enhancement stream, which may be further multiplexed or otherwise combined to generate an encoded data stream. In certain cases, the base stream and the enhancement stream may be transmitted separately. References to an encoded data as described herein may refer to the enhancement stream or a combination of the base stream and the enhancement stream. The base stream may be decoded by a hardware decoder while the enhancement stream is may be suitable for software processing implementation with suitable power consumption. This general encoding structure creates a plurality of degrees of freedom that allow great flexibility and adaptability to many situations, thus making the coding format suitable for many use cases including OTT transmission, live streaming, live ultra-high-definition UHD broadcast, and so on. Although the decoded output of the base codec is not intended for viewing, it is a fully decoded video at a lower resolution, making the output compatible with existing decoders and, where considered suitable, also usable as a lower resolution output.

In certain examples, each or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

Returning to the initial process described above, where a base stream is provided along with two levels (or sub-levels) of enhancement within an enhancement stream, an example of a generalised encoding process is depicted in the block diagram of FIG. 6. An input video 600 at an initial resolution is processed to generate various encoded streams 601, 602, 603. A first encoded stream (encoded base stream) is produced by feeding a base codec (e.g., AVC, HEVC, or any other codec) with a down-sampled version of the input video. The encoded base stream may be referred to as the base layer or base level. A second encoded stream (encoded level 1 stream) is produced by processing the residuals obtained by taking the difference between a reconstructed base codec video and the down-sampled version of the input video. A third encoded stream (encoded level 2 stream) is produced by processing the residuals obtained by taking the difference between an up-sampled version of a corrected version of the reconstructed base coded video and the input video. In certain cases, the components of FIG. 6 may provide a general low complexity encoder. In certain cases, the enhancement streams may be generated by encoding processes that form part of the low complexity encoder and the low complexity encoder may be configured to control an independent base encoder and decoder (e.g., as packaged as a base codec). In other cases, the base encoder and decoder may be supplied as part of the low complexity encoder. In one case, the low complexity encoder of FIG. 6 may be seen as a form of wrapper for the base codec, where the functionality of the base codec may be hidden from an entity implementing the low complexity encoder.

A down-sampling operation illustrated by down-sampling component 105 may be applied to the input video to produce a down-sampled video to be encoded by a base encoder 613 of a base codec. The down-sampling can be done either in both vertical and horizontal directions, or alternatively only in the horizontal direction. The base encoder 613 and a base decoder 614 may be implemented by a base codec (e.g., as different functions of a common codec). The base codec, and/or one or more of the base encoder 613 and the base decoder 614 may comprise suitably configured electronic circuitry (e.g., a hardware encoder/decoder) and/or computer program code that is executed by a processor.

Each enhancement stream encoding process may not necessarily include an upsampling step. In FIG. 6 for example, the first enhancement stream is conceptually a correction stream while the second enhancement stream is upsampled to provide a level of enhancement.

Looking at the process of generating the enhancement streams in more detail, to generate the encoded Level 1 stream, the encoded base stream is decoded by the base decoder 614 (i.e. a decoding operation is applied to the encoded base stream to generate a decoded base stream). Decoding may be performed by a decoding function or mode of a base codec. The difference between the decoded base stream and the down-sampled input video is then created at a level 1 comparator 610 (i.e. a subtraction operation is applied to the down-sampled input video and the decoded base stream to generate a first set of residuals). The output of the comparator 610 may be referred to as a first set of residuals, e.g. a surface or frame of residual data, where a residual value is determined for each picture element at the resolution of the base encoder 613, the base decoder 614 and the output of the down-sampling block 605.

The difference is then encoded by a first encoder 615 (i.e. a level 1 encoder) to generate the encoded Level 1 stream 602 (i.e. an encoding operation is applied to the first set of residuals to generate a first enhancement stream).

As noted above, the enhancement stream may comprise a first level of enhancement 602 and a second level of enhancement 603. The first level of enhancement 602 may be considered to be a corrected stream, e.g. a stream that provides a level of correction to the base encoded/decoded video signal at a lower resolution than the input video 600. The second level of enhancement 603 may be considered to be a further level of enhancement that converts the corrected stream to the original input video 600, e.g. that applies a level of enhancement or correction to a signal that is reconstructed from the corrected stream.

In the example of FIG. 6, the second level of enhancement 603 is created by encoding a further set of residuals. The further set of residuals are generated by a level 2 comparator 619. The level 2 comparator 619 determines a difference between an upsampled version of a decoded level 1 stream, e.g. the output of an upsampling component 617, and the input video 600. The input to the up-sampling component 617 is generated by applying a first decoder (i.e. a level 1 decoder) to the output of the first encoder 615. This generates a decoded set of level 1 residuals. These are then combined with the output of the base decoder 614 at summation component 620. This effectively applies the level 1 residuals to the output of the base decoder 614. It allows for losses in the level 1 encoding and decoding process to be corrected by the level 2 residuals. The output of summation component 620 may be seen as a simulated signal that represents an output of applying level 1 processing to the encoded base stream 601 and the encoded level 1 stream 602 at a decoder.

As noted, an upsampled stream is compared to the input video which creates a further set of residuals (i.e. a difference operation is applied to the upsampled re-created stream to generate a further set of residuals). The further set of residuals are then encoded by a second encoder 621 (i.e. a level 2 encoder) as the encoded level 2 enhancement stream (i.e. an encoding operation is then applied to the further set of residuals to generate an encoded further enhancement stream).

Thus, as illustrated in FIG. 6 and described above, the output of the encoding process is a base stream 601 and one or more enhancement streams 602, 603 which preferably comprise a first level of enhancement and a further level of enhancement. The three streams 601, 602 and 603 may be combined, with or without additional information such as control headers, to generate a combined stream for the video encoding framework that represents the input video 600. It should be noted that the components shown in FIG. 6 may operate on blocks or coding units of data, e.g. corresponding to 2×2 or 4×4 portions of a frame at a particular level of resolution. The components operate without any inter-block dependencies, hence they may be applied in parallel to multiple blocks or coding units within a frame. This differs from comparative video encoding schemes wherein there are dependencies between blocks (e.g., either spatial dependencies or temporal dependencies). The dependencies of comparative video encoding schemes limit the level of parallelism and require a much higher complexity.

A corresponding generalised decoding process is depicted in the block diagram of FIG. 7. FIG. 7 may be said to show a low complexity decoder that corresponds to the low complexity encoder of FIG. 6. The low complexity decoder receives the three streams 601, 602, 603 generated by the low complexity encoder together with headers 704 containing further decoding information. The encoded base stream 601 is decoded by a base decoder 710 corresponding to the base codec used in the low complexity encoder. The encoded level 1 stream 602 is received by a first decoder 711 (i.e. a level 1 decoder), which decodes a first set of residuals as encoded by the first encoder 615 of FIG. 1. At a first summation component 712, the output of the base decoder 710 is combined with the decoded residuals obtained from the first decoder 711. The combined video, which may be said to be a level 1 reconstructed video signal, is upsampled by upsampling component 713. The encoded level 2 stream 103 is received by a second decoder 714 (i.e. a level 2 decoder). The second decoder 714 decodes a second set of residuals as encoded by the second encoder 621 of FIG. 1. Although the headers 704 are shown in FIG. 7 as being used by the second decoder 714, they may also be used by the first decoder 711 as well as the base decoder 710. The output of the second decoder 714 is a second set of decoded residuals. These may be at a higher resolution to the first set of residuals and the input to the upsampling component 713. At a second summation component 715, the second set of residuals from the second decoder 714 are combined with the output of the up-sampling component 713, i.e. an upsampled reconstructed level 1 signal, to reconstruct decoded video 750.

As per the low complexity encoder, the low complexity decoder of FIG. 7 may operate in parallel on different blocks or coding units of a given frame of the video signal. Additionally, decoding by two or more of the base decoder 710, the first decoder 711 and the second decoder 714 may be performed in parallel. This is possible as there are no inter-block dependencies.

In the decoding process, the decoder may parse the headers 704 (which may contain global configuration information, picture or frame configuration information, and data block configuration information) and configure the low complexity decoder based on those headers. In order to re-create the input video, the low complexity decoder may decode each of the base stream, the first enhancement stream and the further or second enhancement stream. The frames of the stream may be synchronised and then combined to derive the decoded video 750. The decoded video 750 may be a lossy or lossless reconstruction of the original input video 100 depending on the configuration of the low complexity encoder and decoder. In many cases, the decoded video 750 may be a lossy reconstruction of the original input video 600 where the losses have a reduced or minimal effect on the perception of the decoded video 750.

In each of FIGS. 6 and 7, the level 2 and level 1 encoding operations may include the steps of transformation, quantization and entropy encoding (e.g., in that order). These steps may be implemented in a similar manner to the operations shown in FIGS. 4 and 5. The encoding operations may also include residual ranking, weighting and filtering. Similarly, at the decoding stage, the residuals may be passed through an entropy decoder, a de-quantizer and an inverse transform module (e.g., in that order). Any suitable encoding and corresponding decoding operation may be used. Preferably however, the level 2 and level 1 encoding steps may be performed in software (e.g., as executed by one or more central or graphical processing units in an encoding device).

The transform as described herein may use a directional decomposition transform such as a Hadamard-based transform. Both may comprise a small kernel or matrix that is applied to flattened coding units of residuals (i.e. 2×2 or 4×4 blocks of residuals). More details on the transform can be found for example in patent applications PCT/EP2013/059847 or PCT/GB2017/052632, which are incorporated herein by reference. The encoder may select between different transforms to be used, for example between a size of kernel to be applied.

The transform may transform the residual information to four surfaces. For example, the transform may produce the following components or transformed coefficients: average, vertical, horizontal and diagonal. A particular surface may comprise all the values for a particular component, e.g. a first surface may comprise all the average values, a second all the vertical values and so on. As alluded to earlier in this disclosure, these components that are output by the transform may be taken in such embodiments as the coefficients to be quantized in accordance with the described methods. A quantization scheme may be useful to create the residual signals into quanta, so that certain variables can assume only certain discrete magnitudes. Entropy encoding in this example may comprise run length encoding (RLE), then processing the encoded output is processed using a Huffman encoder. In certain cases, only one of these schemes may be used when entropy encoding is desirable.

In summary, the methods and apparatuses herein are based on an overall approach which is built over an existing encoding and/or decoding algorithm (such as MPEG standards such as AVC/H.264, HEVC/H.265, etc. as well as non-standard algorithm such as VP9, AV1, and others) which works as a baseline for an enhancement layer which works accordingly to a different encoding and/or decoding approach. The idea behind the overall approach of the examples is to hierarchically encode/decode the video frame as opposed to the use block-based approaches as used in the MPEG family of algorithms. Hierarchically encoding a frame includes generating residuals for the full frame, and then a decimated frame and so on.

As indicated above, the processes may be applied in parallel to coding units or blocks of a colour component of a frame as there are no inter-block dependencies. The encoding of each colour component within a set of colour components may also be performed in parallel (e.g., such that the operations are duplicated according to (number of frames)*(number of colour components)*(number of coding units per frame)). It should also be noted that different colour components may have a different number of coding units per frame, e.g. a luma (e.g., Y) component may be processed at a higher resolution than a set of chroma (e.g., U or V) components as human vision may detect lightness changes more than colour changes.

Thus, as illustrated and described above, the output of the decoding process is an (optional) base reconstruction, and an original signal reconstruction at a higher level. This example is particularly well-suited to creating encoded and decoded video at different frame resolutions. For example, the input signal 30 may be an HD video signal comprising frames at 1920×1080 resolution. In certain cases, the base reconstruction and the level 2 reconstruction may both be used by a display device. For example, in cases of network traffic, the level 2 stream may be disrupted more than the level 1 and base streams (as it may contain up to 4× the amount of data where down-sampling reduces the dimensionality in each direction by 2). In this case, when traffic occurs the display device may revert to displaying the base reconstruction while the level 2 stream is disrupted (e.g., while a level 2 reconstruction is unavailable), and then return to displaying the level 2 reconstruction when network conditions improve. A similar approach may be applied when a decoding device suffers from resource constraints, e.g. a set-top box performing a systems update may have an operation base decoder 220 to output the base reconstruction but may not have processing capacity to compute the level 2 reconstruction.

The encoding arrangement also enables video distributors to distribute video to a set of heterogeneous devices; those with just a base decoder 720 view the base reconstruction, whereas those with the enhancement level may view a higher-quality level 2 reconstruction. In comparative cases, two full video streams at separate resolutions were required to service both sets of devices. As the level 2 and level 1 enhancement streams encode residual data, the level 2 and level 1 enhancement streams may be more efficiently encoded, e.g. distributions of residual data typically have much of their mass around 0 (i.e. where there is no difference) and typically take on a small range of values about 0. This may be particularly the case following quantization. In contrast, full video streams at different resolutions will have different distributions with a non-zero mean or median that require a higher bit rate for transmission to the decoder. In the examples described herein residuals are encoded by an encoding pipeline. This may include transformation, quantization and entropy encoding operations. It may also include residual ranking, weighting and filtering. Residuals are then transmitted to a decoder, e.g. as L-1 and L-2 enhancement streams, which may be combined with a base stream as a hybrid stream (or transmitted separately). In one case, a bit rate is set for a hybrid data stream that comprises the base stream and both enhancements streams, and then different adaptive bit rates are applied to the individual streams based on the data being processed to meet the set bit rate (e.g., high-quality video that is perceived with low levels of artefacts may be constructed by adaptively assigning a bit rate to different individual streams, even at a frame by frame level, such that constrained data may be used by the most perceptually influential individual streams, which may change as the image data changes).

The sets of residuals as described herein may be seen as sparse data, e.g. in many cases there is no difference for a given pixel or area and the resultant residual value is zero. When looking at the distribution of residuals much of the probability mass is allocated to small residual values located near zero—e.g. for certain videos values of −2, −1, 0, 1, 2 etc. occur the most frequently. In certain cases, the distribution of residual values is symmetric or near symmetric about 0. In certain test video cases, the distribution of residual values was found to take a shape similar to logarithmic or exponential distributions (e.g., symmetrically or near symmetrically) about 0. The exact distribution of residual values may depend on the content of the input video stream.

Residuals may be treated as a two-dimensional image in themselves, e.g. a delta image of differences. Seen in this manner the sparsity of the data may be seen to relate features like "dots", small "lines", "edges", "corners", etc. that are visible in the residual images. It has been found that these features are typically not fully correlated (e.g., in space and/or in time). They have characteristics that differ from the characteristics of the image data they are derived from (e.g., pixel characteristics of the original video signal).

As the characteristics of residuals differ from the characteristics of the image data they are derived from it is generally not possible to apply standard encoding approaches, e.g. such as those found in traditional Moving Picture Experts Group (MPEG) encoding and decoding standards. For example, many comparative schemes use large transforms (e.g., transforms of large areas of pixels in a normal video frame). Due to the characteristics of residuals, e.g. as described above, it would be very inefficient to use these comparative large transforms on residual images. For example, it would be very hard to encode a small dot in a residual image using a large block designed for an area of a normal image.

Certain examples described herein address these issues by instead using small and simple transform kernels (e.g., 2×2 or 4×4 kernels—the Directional Decomposition and the Directional Decomposition Squared—as presented herein). The transform described herein may be applied using a Hadamard matrix (e.g., a 4×4 matrix for a flattened 2×2 coding block or a 16×16 matrix for a flattened 4×4 coding block). This moves in a different direction from comparative video encoding approaches. Applying these new approaches to blocks of residuals generates compression efficiency. For example, certain transforms generate uncorrelated transformed coefficients (e.g., in space) that may be efficiently compressed. While correlations between transformed coefficients may be exploited, e.g. for lines in residual images, these can lead to encoding complexity, which is difficult to implement on legacy and low-resource devices, and often generates other complex artefacts that need to be corrected. Pre-processing residuals by setting certain residual values to 0 (i.e. not forwarding these for processing) may provide a controllable and flexible way to manage bitrates and stream bandwidths, as well as resource use.

Examples Relating to Enhancement of a Higher Resolution Tier

In certain examples described herein an upsampling operation, e.g. one or more of operations 202 in FIGS. 2 and 3, 526, 522 or 530 in FIG. 5, 617 in FIG. 6 or 713 in FIG. 7 (as well as other upsampling operations that are not shown), includes optional enhancement operations. These optional enhancement operations may be signalled to a decoder from the encoder. They may comprise one or more signal processing operations to enhance an output of a particular tier in the tier-based hierarchical format. In a video example, the output may comprise a reconstructed video signal at a particular resolution (e.g., outputs 520, 528 or 531 in FIG. 5 or decoded video 750 in FIG. 7). The optional enhancement operations may provide for so-called super-resolution modes. The optional enhancement operations may be performed in place of, and/or in addition to, existing default upsampling operations. The existing default upsampling operations may comprise the upsampling operations as defined in a standard tier-based hierarchical coding scheme (e.g., as defined in one or more of the LCEVC or VC-6 standard definitions). As such, a decoder may be able to perfectly adequately decode a signal without the optional enhancement operations, where these operations provide optional additional functionality, such as a sharper-looking image where it is desired to use this functionality. For example, the optional enhancement operations may only be available if there are available computing resources at the decoder and/or if the decoder is configured to apply the operations.

In certain examples, the signalling for these optional enhancement operations may be provided using user data within the bit stream for the tier-based hierarchical format. This user data may comprise a configurable stream of data for carrying data that is not used directly to reconstruct the output signal (e.g., that is not a base encoded stream or a residual/enhancement encoded stream). In certain examples, the user data may be embedded within values that are used directly to reconstruct the output signal, e.g. within a residual/enhancement encoded stream. In other example, or in addition to the aforementioned example, user data may also be embedded within supplementary enhancement information messages for the bit stream.

Figure 8A:
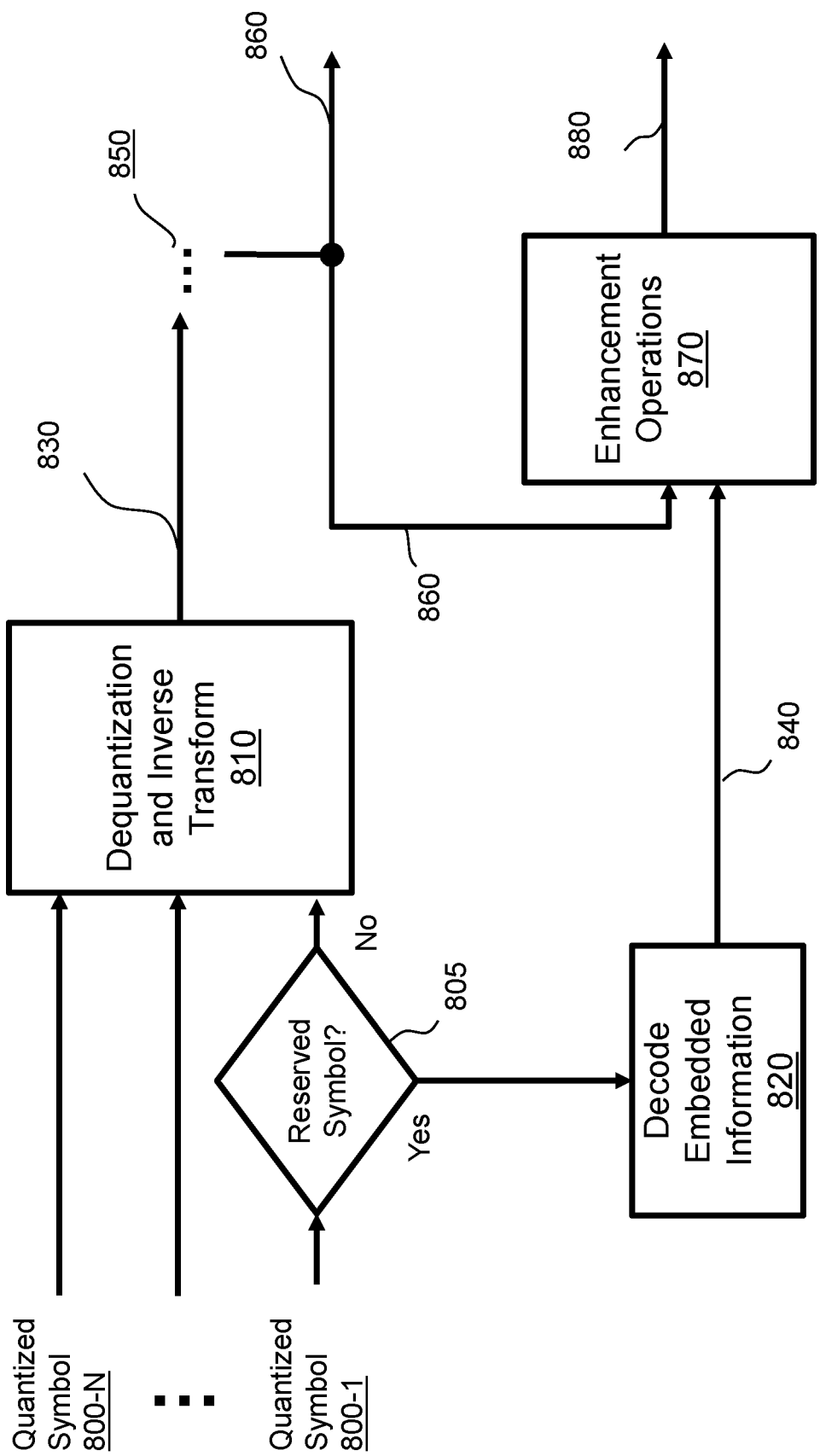
FIG. 8A shows a block diagram of an example decoding system with optional enhancement operations.

FIG. 8A shows an example wherein the signal processing information for one or more enhancement operations is embedded in one or more values received in one or more encoded data layers transmitted within a stream of encoded data. In this example, said values are associated with transformed coefficients that are processed to derive elements of the signal during the decoding. These transformed coefficients may comprise the A, V, H, D output by the transform 402 in FIG. 4 or that form part of one or more of the L1 and L2 encoded streams in FIG. 6. In certain examples, a transform is applied as a linear transformation (e.g., of the form y=Ax, where x is a flattened input derived from an n by n block of residuals and y is the set of transformed coefficients—typically of the same length as x). As described above the transform may be implemented using a 4 by 4 or 16 by 16 Hadamard matrix (depending on whether n is 2 or 4). In the present example, the input the signal processing information is embedded in one or more values for a predefined transformed coefficient within the set of different transformed coefficients that are generated by the encoding transform, e.g. values for a particular element or index in the output vector y. In certain examples, the H (n=2)

or HH (n=4) element is preferred for this embedding, as replacement of these values has the least effect on the reconstructed output.

Referring to FIG. 8A, there is shown an example of method implemented within a decoding system. A set of quantized symbols 800-1 to 800-N are received and processed. These quantized symbols comprise quantized transformed coefficients, where quantization may be optional and/or varied in degree based on encoding configurations. The quantized symbols may comprise the symbols that result from one or more of the L1 and L2 encoded streams and/or correspond to the data generated via the quantization block 403 in FIG. 4. In the example of FIG. 8A, one of the symbols is configured to carry the user data. As such, the selected symbol (e.g., derived from the H or HH transformed coefficient) is said to be a "reserved symbol". Depending on whether symbol 800-1 is to be intended as reserved symbol, the decoder follows two different approaches.

If symbol 800-1 is not to be intended as reserved symbol, e.g. is intended to carry residual data for use in reconstructing the signal, its decoding follows the normal process implemented for the other symbols in the set: dequantization and reverse transform according to method 810, producing a set of decoded data 830. This is shown by comparison block 805. For example, method 810 may comprise at least blocks 511 and 513 in FIG. 5 and/or blocks that form part of one or more of the L-1 and L-2 decoding processes 711 and 714. Said decoded data may then be further processed by means of decoding operations 850 to produce decoded signal 860. In one set of examples, the decoding operations 850 may comprise the reconstruction as per stage 505 of FIG. 5 and/or the reconstruction implemented via 715 in FIG. 7. In this case, the decoded signal 860 may comprise the reconstructed picture 531 or 750. In other cases, the decoding operations 850 may comprise operations that are performed to generate an input to an upsampling operation in the tier-based hierarchical format, e.g. the input to 530 in FIG. 5 or 713 in FIG. 7. In this case, the decoded signal 860 comprises this input to the upsampling operation.

If symbol 800-1 is to be intended as reserved symbol, its decoding follows a different process, as indicated by comparison block 805. At block 820, a decoding method 820 is applied to the embedded signal processing information, e.g. the user data within the symbol 800-1 to extract the signal processing information 840. This signal processing information may comprise information on enhancement operations to perform at block 870. For example, it may comprise one or more flags to indicate one or more signal processing operations to perform. In certain cases, it may also comprise parameters for those signal processing operations, e.g. coefficients for adaptive filters. In one case, the parameters for the signal processing operations may change with coding unit or data block (e.g., the n by n data set described above). For example, the parameters for the signal processing operations may change with each coding unit or data block or with successive groups of coding units or data blocks. In these cases, the reserved symbol for a given coding unit or data block may comprise the parameters for the signal processing operations to be performed with respect to that unit or block.

At block 870 of FIG. 8A, one or more signal processing operations are performed as part of enhancement operations 870 as per the signal processing information 840 to generate an enhanced reconstruction of the signal 880. This enhanced reconstruction of the signal 880 may be used in place of either the output 531 or 750 in FIGS. 5 and 7, or in place of the output of the upsampling 530 or 713 in FIGS. 5 and 7.

In some examples, a bit in the decoded bytestream (not shown in the figure) signals to the decoder that symbol 800-1 is to be processed as reserved symbol. For example, this bit may comprise a "user data" flag that is switched "on" or "off" in global configuration information.

Although examples have been provided in the context of a tier-based hierarchical format, in other examples, the approaches described herein may be used in a non-tier-based and/or non-hierarchical format. For example, the operations of FIG. 8A may be performed on a data stream that does not comprise different stream outputs for different levels of quality, but that still embeds enhancement operation information in transformed coefficients.

Figure 8B:
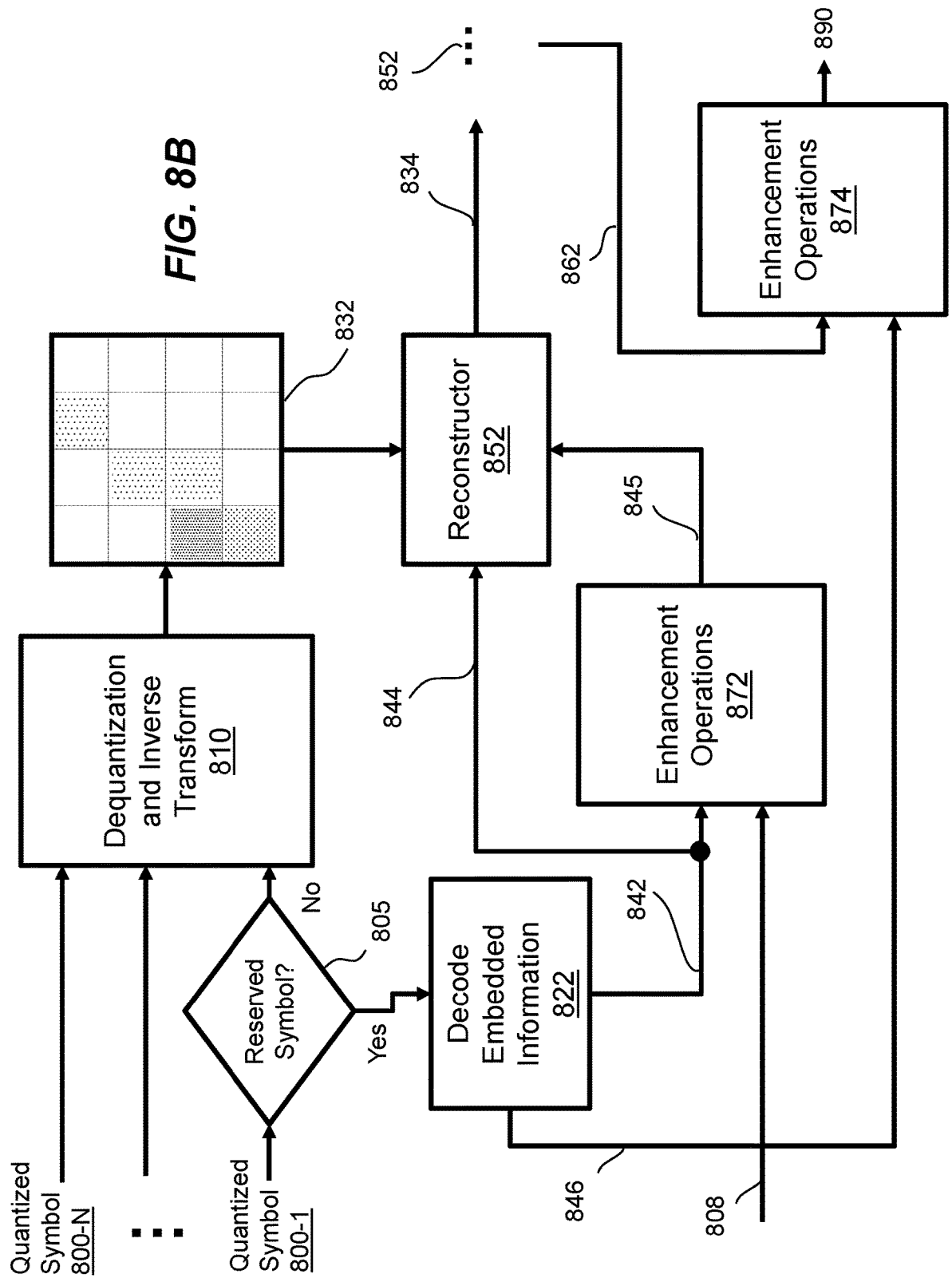
FIG. 8B shows a block diagram of another example decoding system with enhancement operations at two tiers in a hierarchical decoding process.

FIG. 8B shows a variation of the example of FIG. 8A, wherein enhancement operations are optionally performed on multiple levels of quality within a tier-based hierarchical format. Similar reference numerals are used to refer to similar components, wherein variation in the last digit of the reference numeral indicates possible variation in the example.

Referring to FIG. 8B, there is shown an example of method implemented within a decoding system that implements a tier-based hierarchical coding method. As per FIG. 8A, quantized symbol 800-1 is received and processed along with other quantized symbols 800-2 . . . 800-N. In preferred example, the quantized symbols represent a residual data stream for the first level of quality. The decoder checks at block 805 whether symbol 800-1 should be intended as a reserved symbol. Depending on whether symbol 800-1 is to be intended as reserved symbol, the decoder follows two different approaches.

If symbol 800-1 is not to be intended as reserved symbol, its decoding follows the normal process implemented for the other symbols in the set: dequantization and inverse transform according to method 810, producing a set of decoded residual data 832.

In FIG. 8B there are two sets of enhancement operations, a first set of enhancement operations 872 for a signal at a first level of quality (LOQ1 or L-1) and a second set of enhancement operations 874 for a signal at a second level of quality (LOQ2 or L-2). These sets of enhancement operations may be applied flexibly based on decoder configurations and/or signal processing information, e.g. only the lower level or only the upper level may be applied in different circumstances. The first set of enhancement operations 872 may be applied to one or more of data 515, 518, 526 etc. in FIG. 5 or the output of the base decoder 710. The second set of enhancement operations 874 may be applied following reconstruction by reconstructor 852, e.g. following the additions shown in FIG. 5 or 712 in FIG. 7.

If symbol 800-1 is to be intended as reserved symbol, its decoding follows a different process via block 805. At block 822, a method is enacted to decode embedded information within the reserved symbol, e.g. to parse the data of the reserved symbol to extract the signal processing information 842, 844 and 846. The reserved symbol may comprise data that is configured according to a specified syntax. This syntax may comprise a header portion and a payload portion. In FIG. 8B, signal processing information is extracted for the first set of enhancement operation 872, the reconstructor 852 and the second set of enhancement operations 874. However, in other examples, any one or more of this data may be extracted, e.g. in one case no enhancement operations may be applied to the preliminary rendition of the signal 808 or at the reconstructor 852, such that the reserved symbols at the first level of quality 400-1 comprise signal processing information for a higher level of quality. This may have advantages as the first level of quality is typically smaller in size (as it is of a reduced resolution) and is typically received prior to the second level of quality.

At block 822, the reserved symbol 800-1 is processed to produce signal processing information 842, 844, 846. The residual data 832 (e.g., at the first level of quality—e.g. the output of L-1 decoding at block 711 of FIG. 7 or one of the echelons from −1 downwards in FIG. 5) is further processed by means of reconstructor 852 (e.g., along with other residual data for the rest of the sample or frame of the signal) to produce a reconstructed rendition of signal at a first level of quality 834 (e.g., LOQ #1 or L-1 in FIG. 7). In FIG. 8B, the first set of enhancement operations 872 may be applied to a preliminary rendition of the signal at the first level of quality 808, e.g. based on the signal processing information 842. As discussed above, this may comprise enhancing a reconstructed base signal. The signal processing information may also comprise information to enact one or more signal processing operations at the reconstructor 852, as illustrated by 844.

Once a possibly enhanced rendition of the signal at the first level of quality 834 is output by the reconstructor 852, e.g. following addition of residual data 832 to data derived from the preliminary rendition of the signal at the first level of quality 808, the rendition 834 is further processed by decoding operations 852 to produce a rendition of the signal at a second level of quality 862. In these examples, the second level of quality is assumed to be at a higher resolution than the first level of quality, i.e. a higher tier signal as compared to the lower tier signal at the first level of quality. The difference in resolution may be a customised factor in one or multiple dimensions of a multi-dimension signal (e.g., horizontal and vertical dimensions of a video frame). The decoding operations 852 may comprise one or more of the operations at stage 505 and/or the operations at blocks 713 and 715 of FIG. 7. The rendition of the signal at a second level of quality 862 may comprise the output 750 in FIG. 7, or one of the higher-level outputs 528 or 531 in FIG. 5. In FIG. 8B, the rendition of the signal at a second level of quality 862 is processed by the second set of enhancement operations 874 along with the signal processing information 846 in order to produce an enhanced final rendition of signal at the second level of quality 890. The output 890 may comprise a signal suitable for rendering, e.g. for display or output to a user via an output device. In certain examples, the second set of enhancement operations 874 may be applied during the decoding operations 852. For example, the second set of enhancement operations 874 may be applied in addition to, or instead of, a set of upsampling operations that conform to one of the LCEVC or VC-6 standards.

In examples described herein, one or more signal processing operations to enhance a higher resolution tier, e.g. that form part of enhancement operations 870 or 874 in FIGS. 8A and 8B, may be performed "in-loop" or "out-of-loop". "In-loop" signal processing operations are those that are applied as part of a decoding method for the higher resolution tier, e.g. coding units or data blocks may be iteratively processed (both in series and in parallel as described earlier above) within a decoding loop and the signal processing operations may be applied during that decoding loop to data for particular coding units or data blocks. "Out-of-loop" signal processing operations are those that applied to a reconstructed signal that is output by the decoding method (i.e. the decoding loop). This reconstructed signal may comprise a viewable sequence of frames for a video signal. In one case, "in-loop" processing involves applying the signal processing operations prior to the addition of residual data for the higher resolution tier, e.g. prior to the addition at block 532 of FIG. 5 or the addition at block 715 of FIG. 7. "In-loop" processing may comprise applying the one or more signal processing operations as an alternative enhanced upsampling operation that is performed instead of a standard upsampling operation. This is described in further detail below. Further, both "in-loop" and "out-of-loop" signal processing operations may be signalled and applied, e.g. a convolutional neural network upsampler may be applied "in-loop" and a sharpening filter may be applied "out-of-loop".

"In-loop" signal processing operations prior to the addition of residual data provides an advantage that the residual data itself may correct for artifacts introduced by the signal processing operations. For example, if the signal processing operations to enhance the higher tier signal are applied as part of one of the upsampling procedures 202 in FIG. 2 or 3 or upsampling 617 in FIG. 6, then the subsequent comparison at blocks 203 or 619 generates residual data that indicates a difference between the output of the enhancement operations and the original input signal (e.g., data frame 210 or input video 600). Hence, the signal processing operations do not need to always produce high-quality, artifact-free output; if they do produce visible artifacts, these may be corrected by the residual data as applied at block 532 or 715 in FIG. 7. This becomes particularly advantageous when implementing unpredictable neural network enhancers and/or statistical processing where the form of the output cannot be guaranteed (e.g., due to the complexity of the processes and/or the variation of the statistical processes). For example, a super-resolution upscaler need only produce high-quality predictions 80% of the time; the remaining 20% of pixels that may seem to be an artifact may be corrected by the residuals. There may also be a benefit that better predictive upsampling helps to reduce a number of non-zero bytes that are needed for the higher tier encoded data streams (e.g., a good prediction may have many residuals with values at or near to zero), hence reducing the number of bits needed for the higher level encoded streams.

In certain examples, a process of encoding the signal at a first level of quality (e.g., 615 of FIG. 6) may comprise detecting one or more impairments that cannot be suitably corrected with residual data at the target bitrate (e.g., one or more of the encoded level 1 stream 602 and the encoded level 2 stream 603). In this case, the encoding operation for the first level of quality (e.g., 615 in FIG. 6) produces an encoded data stream (e.g., encoded level 1 stream 602) that leverages a set of reserved symbols in the encoded residual data as described above in order to signal to the decoder the type and/or the location of the impairments that it should expect. The decoder is thus able to apply appropriate corrections to attenuate the impairment (e.g., reduce a visual effect). In certain examples, the encoding operation for the first level of quality toggles a specific bit in the encoded bytestream (e.g., the encoded level 1 stream 602 or a multiplexed stream comprising two or more of the encoded base stream 601, the encoded level 1 stream 602 and the encoded level 2 stream) to signal to the decoder whether a given set of symbols in the encoded data should be interpreted as actual residual data or as additional contextual information (i.e. signal processing information) to inform signal enhancement operations. In certain examples, the encoder "in-loop" decoding of the output of the first level of quality encoding (e.g., L-1 decoding 618 in FIG. 6) may also use the signal processing information to simulate the reconstruction that is to be produced by the decoder.

As described above, in the present examples, when decoding a specific set of data within an encoded data stream and finding a specific set of quantized symbols, the decoder does not interpret said symbols as residual data, but instead performs signal-enhancement operations according to the received symbols. This use of reserved symbols may be indicated be a bit in the decoded bytestream that is signalled to one or more of the L-1 decoding 711 and the L-2 decoding 714 of FIG. 7, e.g. within control headers 714. In this case, the bit indicates that a specific set of quantized symbols in a specific set of residual data should not be interpreted as actual residual data, but as contextual information to inform signal enhancement operations. In certain examples, some reserved symbols may correspond to specific types of impairments, informing the decoder on postprocessing operations (whether in loop or at the end of the decoding process) that may be applied to a corresponding area of the signal in order to improve the quality of the final signal reconstruction.

Conditional Enhancement

In examples described herein one or more signal processing operations that act to enhance data associated with a higher tier of a tier-based hierarchically encoded signal may be selectively applied based on determine signal processing information. The phrase "selective" application or performance of the one or more signal processing operations indicates that the operations may be optional. In certain cases, the operations may replace, and/or be provided in addition to, a defined coding process, such as the decoding processes specified by the LCEVC and VC-6 standards. In these cases, the signal processing information may comprise one or more flags that indicate whether one or more respective signal processing operations are to be applied. If the signal processing information is absent and/or has a particular value (e.g., a flag value of "False" or 0), then an encoded data stream may be decoded as per the defined coding process. If the signal processing information is present, and/or has a particular value (e.g., a flag value of "True" or 1), then an encoded data stream may be decoded as per the signal processing operations. It should be noted in examples, that the "enhancement" of the higher resolution tier is an enhancement in addition to the addition of residual data to correct an upsampled rendition of the signal. For example, the signal processing operations may comprise an optional sharpening filter and/or a neural network upsampler.

In certain examples, the selective performance of the signal processing operations is further based on operating conditions or parameters for a decoder performing the decoding. For example, in the case that signal processing information is present and indicates one or more optional signal processing operations, these may only be performed if further criteria are met. For example, selectively performing one or more signal processing operations to enhance the higher resolution tier may comprise determining operating parameters for a decoder performing the decoding. These operating parameters may include one or more of: resource usage (such as central processing unit—CPU—or graphical processing unit—GPU—utilisation or memory utilisation); environmental conditions (e.g., processing unit temperatures); power and/or battery conditions (e.g., whether a decoder is plugged into a mains source and/or an amount of remaining battery power); network conditions (e.g., congestion and/or download speeds) etc. In this case, responsive to a first set of operating parameters, the one or more signal processing operations may be performed to enhance the higher resolution tier using signal processing parameters within the determined signal processing information. Responsive to a second set of operating parameters, the one or more signal processing operations may be omitted, e.g. despite being signalled in the signal processing information and/or the one or more signal processing operations may be substituted with a default signal processing operation. In the latter case, a default or predefined set of decoding processes may be applied (e.g., processes as defined in one of the LCEVC or VC-6 standards). Hence, two decoders with a shared construction (e.g., two mobile phones of the same make) may implement different signal processing operations with the same signalling depending on their current operating conditions. For example, decoders plugged into a mains source of electricity, or with a remaining battery power above a pre-defined threshold, may apply the signal processing operations, which may be more resource intensity than comparative default decoding processes (i.e. use more resources compared to a case when the signal processing operations are not applied).

In one case, a method of decoding a signal may comprise determining a resource use metric for the decoder. This resource metric may be a metric relating to the operating parameters described above, such as a CPU/GPU utilisation, amount of free memory and/or battery percentage. The method may comprise comparing the resource use metric to a resource use threshold. The resource use threshold may be predefined and based on usage tests. Responsive to the comparing indicating an absence of a limitation on resource use for the decoder, the one or more signal processing operations may be performed to enhance the higher resolution tier based on the determined signal processing information. Responsive to the comparing indicating a limitation on resource use for the decoder, the one or more signal processing operations may be omitted during the reconstructing.

The signal processing operations for the enhancement of the higher tier, which may comprise post-processing operations, may also be performed dependent on a capability of a decoder. For example, legacy decoders may not have suitable software, hardware and/or available resources to implement certain signal processing operations. In these cases, a signal processing operation to enhance the higher resolution tier may be identified using the determined signal processing information. For example, header data within coefficient-embedded and/or SEI user data may comprise an m-bit or byte value that indicates a signal processing operation to perform from a plurality of signal processing operations or a flag for each of the plurality of signal processing operations. Once the user data has been parsed and the signal processing operation identified, a decoder may determine whether it is capable of implementing the identified signal processing operation. For example, the decoder may comprise a look-up table comprising signal processing operations it can perform. Responsive to the decoder not being capable of implementing the identified signal processing operation, the determined signal processing information may be ignored and the encoded data stream decoded as per a decoding process similar to those shown in FIGS. 1 to 7. Responsive to the decoder being capable of implementing the identified signal processing operation, the decoder may perform the determined signal processing operation as parameterised by the determined signal processing information. In certain cases, responsive to a positive determination, the checks on operating parameters and/or resource usage as described above may be further implemented. Hence, multiple criteria may be cascaded to determine if one or more signal processing operations are to be applied.

Hence, in the above examples, a decoder may implement signal enhancement operations in a different way (including at times not implementing them at all) based on properties of, and/or condition at, the decoder device at any one time.

Figure 9:
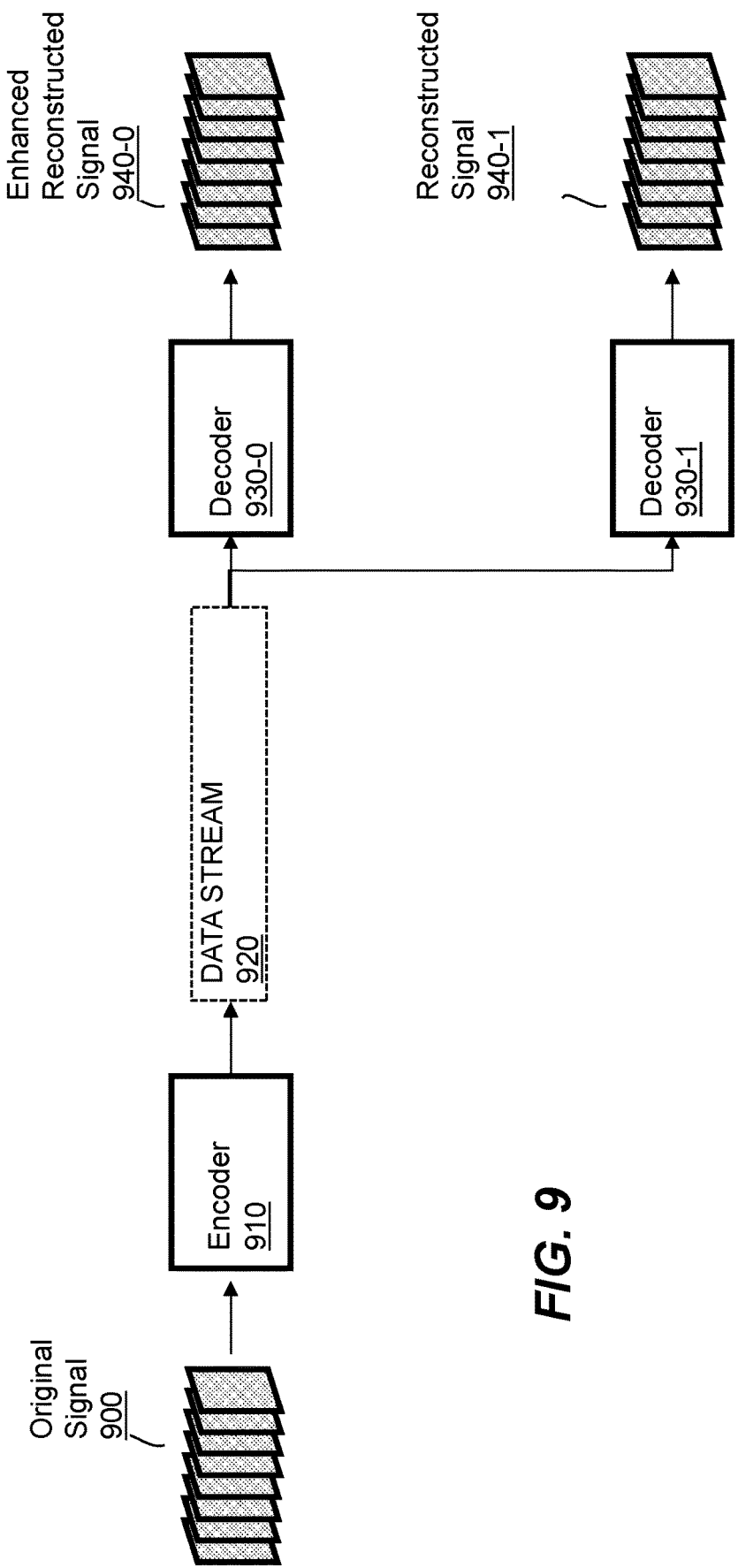
FIG. 9 shows a high-level schematic of multiple example decoders performing different reconstruction operations.

FIG. 9 shows an example of an encoding and decoding system leveraging innovative methods described herein. Encoder 910 processes an original signal 900 to produce data stream 920. Data stream 920 is processed by two decoders. Decoder 930-0 implements signal enhancement methods according to information signalled by encoder 510, decoding reconstructed signal 940-0. Decoder 930-1 ignores information signalled by encoder 910 and reconstructs reconstructed signal 940-1. The reconstructed signal 940-1 may comprise a perfectly viable reconstruction of the signal for the given purposes. For example, it may comprise a normal or standard decoding using options defined as part of the LCEVC or VC-6 standards, making the enhancement operations performed by decoder 930-0 entirely optional. As described above, regardless of the signal processing information transmitted by the encoder 910, the decoder 930-0 may, at times, decides to ignore part of the information signalled by encoder 910. In certain cases, decoder 930-0 defines whether or not to ignore part of the information signalled by the encoder 910 based on information that includes one or more of resolution and framerate of the signal, processing power load at the time of decoding and battery power status. The encoder 910 may signal the signal processing information for the enhancement operations using user data embedded within a transformed coefficient data set, user data within SEI messages and/or using particular predefined combinations of parameter values defined within a signal coding standard.

Example Enhancement Operations

In examples described herein, a method of decoding a signal, comprises obtaining an encoded data stream, parsing the encoded data stream to determine signal processing information signalled by an encoder, and reconstructing a higher resolution tier of the signal from a lower resolution tier of the signal, including selectively performing one or more signal processing operations to enhance the higher resolution tier based on the determined signal processing information. In this section, two sets of example signal processing operations are described. These include a sharpening filter and an efficient neural network upsampler for video signals. In general, both these sets of signal processing operations may be considered a cascade of linear filtering operations within configurable (and optional) intermediate non-linearities.

In the examples of this section, the signal processing operations (which may comprise the enhancement operations 870, 872 and/or 874 in FIGS. 8A and 8B) form part of an upsampler. As discussed above, this upsampler may comprise one of the upsamplers 202 in FIG. 2 or 3, the upsamplers 522, 526 and 530 in FIG. 5, the upsampler 617 of FIG. 6 and the upsampler 713 of FIG. 7. Examples will be described that assume a symmetric upsampling operation is performed at the encoder and the decoder, but these may not always be the case; in certain cases, it may be possible to apply different upsampling at the decoder from that applied at the encoder. In certain examples, the upsampling described herein may also be applied as an addition "extra" upsampling stage that is applied to an output of a standard decoding process (e.g., decoded video 531 or 750). In this case, there may be no corresponding encoder upsampling process and the extra upsampling stage may be seen as a post-processing upscaling stage.

Figure 10A:
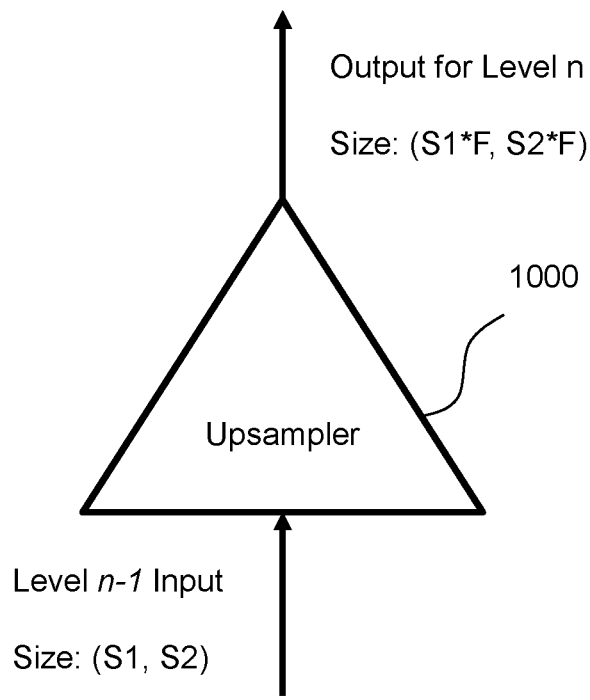
FIG. 10A shows a block diagram of an example upsampler.

FIG. 10A shows a first example 1000 of a basic upsampler configuration. The upsampler may be used to convert between signal data at a first level (n−1) and signal data at a second level n. In the context of the present examples, the upsampler may convert between data processed at enhancement level 1 (i.e. level of quality—LoQ—1) and data processed at enhancement level 2 (i.e. level of quality—LoQ—2), e.g. as per upsampler 713 in FIG. 7. In another case, the upsampler may comprise an extra upsampling stage that is applied to data processed at enhancement level 2 (i.e. level of quality—LoQ—2)—e.g. decoded video 750) to generate a third level of quality (e.g., LoQ 3). In one case, the first level (n−1) may have a first resolution (e.g., size_1 by size_2 elements) and the second level n may have a second resolution (e.g., size_3 by size_4 elements). The number of elements within each dimension at the second resolution may be a multiple of the number of elements within each dimension at the first resolution (e.g., size_3=F1*size_1 and size_4=F2*size_2). In described example, the multiples may be the same in both dimensions (e.g., F1=F2=F and in some examples, F=2).

In certain examples, use of enhancement operations during upsampling may include conversion of element data (e.g., picture elements such as values for a colour plane) from one data format to another. For example, element data (e.g., as input to the up-sampler in non-neural cases) may be in the form of 8- or 16-bit integers, whereas a neural network or other adaptive filtering operation may operate upon float data values (e.g., 32- or 64-bit floating point values). Element data may thus be converted from an integer to a float format before up-sampling, and/or from a float format to an integer format after neural-enhanced up-sampling. This is illustrated in FIG. 10B.

Figure 10B:
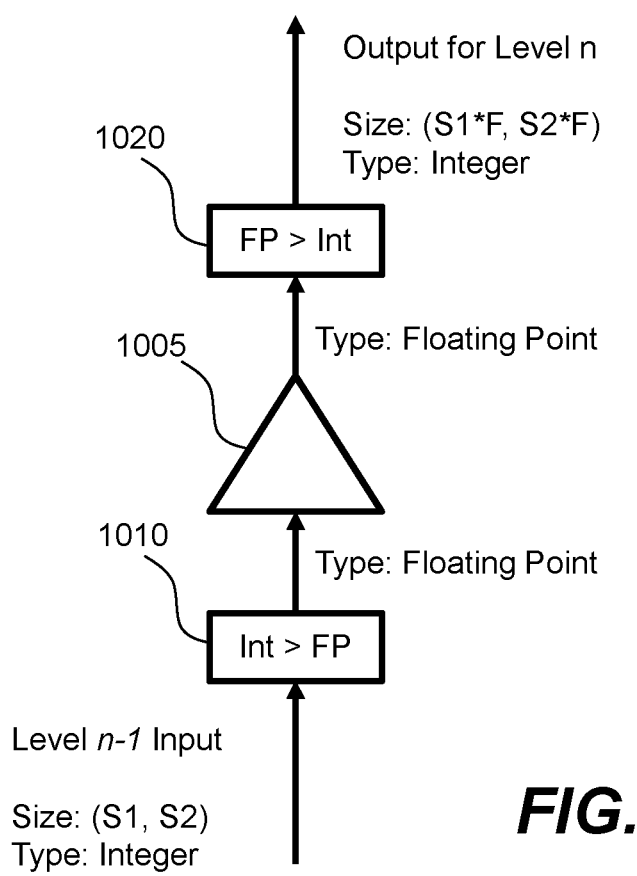
FIG. 10B shows a block diagram of an example conversion process for a floating point upsampler.

In FIG. 10B, an enhanced upsampler 1005 is used. The input to the enhanced up-sampler 1005 is first processed by a first conversion component 1010. The first conversion component 1010 may convert input data from an integer format to a floating-point format. The floating-point data is then input to the enhanced up-sampler 1005, which is free to perform floating-point operations. An output from the neural enhanced up-sampler 1005 comprises data in a floating-point format. In FIG. 10B, this is then processed by a second conversion component 1020, which converts the data from the floating-point format to an integer format. The integer format may be the same integer format as the original input data or a different integer format (e.g., input data may be provided as an 8-bit integer but output as a 10-, 12- or 16-bit integer). The output of the second conversion component 1020 may place the output data in a format suitable for upper enhancement level operations, such as the level 2 enhancement described herein.

In certain examples, instead of, or as well as data format conversion the first and/or second conversion components 1010 and 1020 may also provide data scaling. Data scaling may place the input data in a form better suited to the application of an artificial neural network architecture. For example, data scaling may comprise a normalisation operation. An example normalisation operation is set out below:

$$\text{norm value} = (\text{input\_value} - \text{min\_int\_value}) / (\text{max\_int\_value} - \text{min\_int\_value})$$

where input_value is an input value, min_int_value is a minimum integer value and max_int_value is a maximum integer value. Additional scaling may be applied by multiplying by a scaling divisor (i.e. dividing by a scale factor) and/or subtracting a scaling offset. The first conversion component 1010 may provide for forward data scaling and the second conversion component 1020 may apply corresponding inverse operations (e.g., inverse normalisation). The second conversion component 1020 may also round values to generate an integer representation.

Figure 11A:
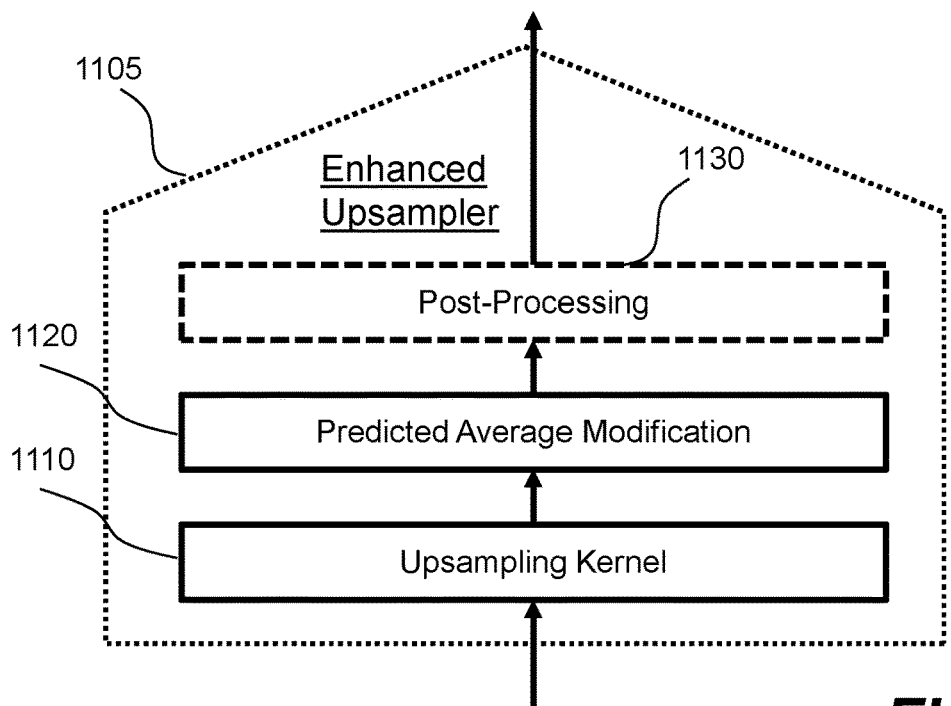
FIGS. 11A and 11B show block diagrams of example enhanced upsamplers.

FIG. 11A shows a first example of an enhanced upsampler 1105 that may be used to apply enhancement operations as described herein (e.g., apply one or more signal processing operations to enhance a tier of a signal). The enhanced upsampler 1105 comprise an upsampling kernel 1110, a predicted average modification component 1120 and a post-processing filter 1130. The upsampling kernel 1110 may comprise a known upsampling kernel, such as one of: a nearest sample upsampler kernel, a bilinear upsampler kernel, and a cubic upsampler kernel as described in the section headed "Decoding processing for the upscaling" in the LCEVC standard specification and international patent application PCT/GB2019/052152, both of which are incorporated by reference herein. The upsampling kernel 1110 converts a lower tier representation of the signal into a higher tier representation of the signal (e.g., by increasing a resolution as explained with respect to FIG. 10A). The predicted average modification component 1120 may add a modifier to the output of the upsampler kernel as described in the section headed "Predicted residual process description" in the LCEVC standard specification and international patent application PCT/GB2020/050574, both of which are incorporated by reference herein.

In short summary of the predicted average modification, a value derived from an element in a first set of residuals from which a block in the up-sampled video was derived is added to the block in the up-sampled second output video. A modifier term is added by the predicted average modification component 1120 and represents a difference between a value from a lower resolution representation and an average of values in the block in the up-sampled video. The predicted average modification component 1120 may be turned on and off based on a flag in control signalling.

Figure 11B:
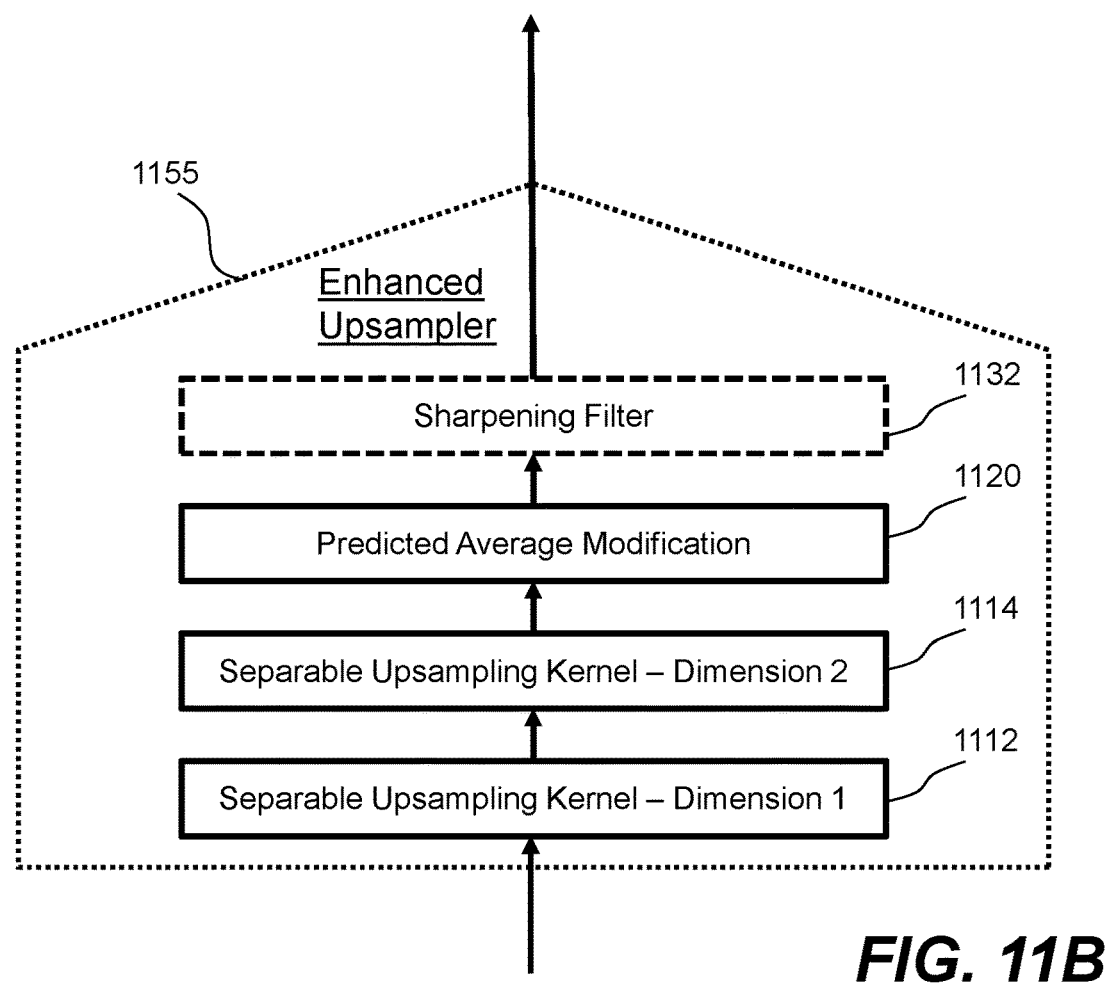

In FIG. 11A, the post-processing filter 1130 comprise a signal processing operation that is used to enhance the higher tier of the signal (e.g., as output by the predicted average modification component 1120). The post-processing filter 1130 may be distinguished from a further dithering filter that may be applied following the addition of any residual data (e.g., from a dithering filter that is applied as a last stage before outputting a final reconstructed video signal). In one example, the post-processing filter 1130 comprises a sharpening filter. This is shown in FIG. 11B. The sharpening filter is configured to sharpen a version of the signal following upsampling. For example, the output of the upsampling may comprise a relatively blurry signal as the resolution is increased from limited lower level information. The sharpening filter may help to sharpen the output of the upsampling in a manner that modifies the data distribution of a set of residual data to be added to the upsampled sample (e.g., reduce the number of non-zero values and/or modify values such that the resulting distribution may be more efficiently compressed by a combination of run-length and Huffman encoding). The sharpening filter may comprise a modified unsharp mask. This is described in more detail below with respect to FIG. 14.

FIG. 11B shows how an enhanced upsampler 1155 with a sharpening filter may be considered to be a cascade of linear operations or filters. In FIG. 11B, a separable upsampling kernel is shown (but in other examples a non-separable kernel may also be used). The separable upsampling kernel has two stages 1112 and 1114 whereby each dimension of a frame is processed using a one-dimensional convolution to effect a resultant two-dimensional convolution. The sharpening filter 1132 may also be applied as a two-dimensional convolution (or a series of one-dimensional convolutions). The coefficient values for the upsampling kernel (e.g., 1110, 1112 or 1114) may be signalled as per the specification of a tier-based hierarchical encoding standard. Each stage of the separable upsampling kernel may comprise a 4-tap upsampling filter. The coefficient values for the sharpening filter 1132 may be signalled by the encoder using user data as described herein (e.g., using embedded coefficient values and/or SEI user data). The coefficients for the sharpening filter 1132 may be adjusted as different coding units or data blocks are upsampled. This may be implemented by extracting coefficient values for the predefined transformed coefficient that is used as a reserved symbol. As such, the sharpening filter 1132 may be adapt based on image content. The coefficients for the sharpening filter 1132 may be determined by the encoder and then signalled to the decoder.

In certain examples, up-sampling may be enhanced by using an artificial neural network. For example, a convolutional neural network may be used as part of the up-sampling operation to predict up-sampled pixel or signal element values. Use of an artificial neural network to enhance an up-sampling operation is described in WO 2019/111011 A1, which is incorporated by reference herein. In the present case, a neural network upsampler may be used to perform the signal processing operations to enhance the higher tier of the signal. The neural network upsampler described herein is a particular efficient "minConv" implementation, that has been tested to operate fast enough to allow processing at common video frame rates (e.g., 30 Hz).

Figure 12A:
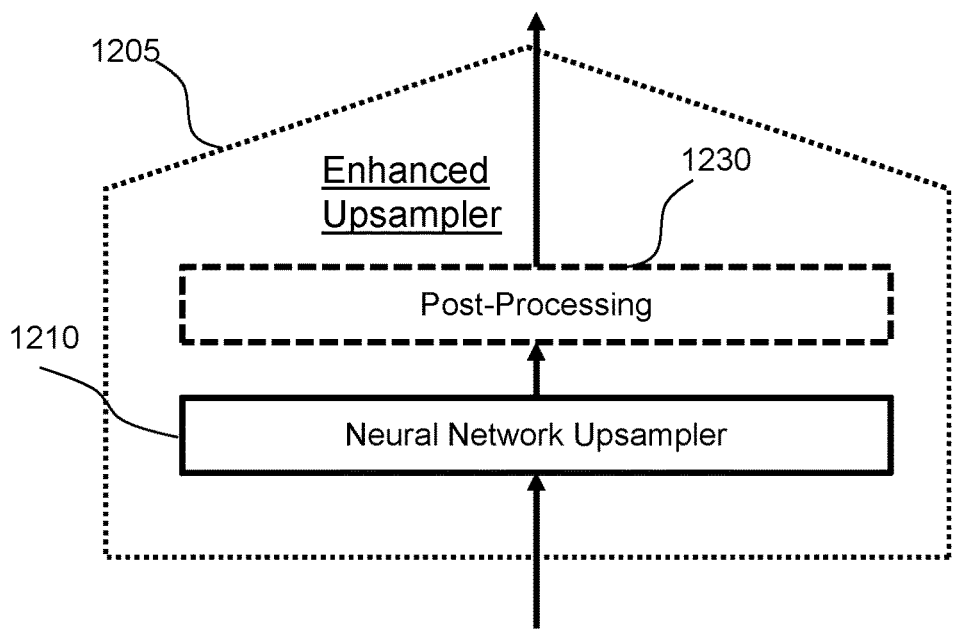

FIG. 12A shows an enhanced upsampler 1205 that comprises a simple neural network upsampler 1210. There is also an optional post-processing operation 1230, which may be a post-processing operation similar to 1130 in FIG. 11A. In the enhanced upsampler 1205, the neural network upsampler 1210 is used as an alternative upsampler to the upsampling kernel 1110 (e.g., an upsampling kernel as defined in a standard decoding process).

Figure 12B:
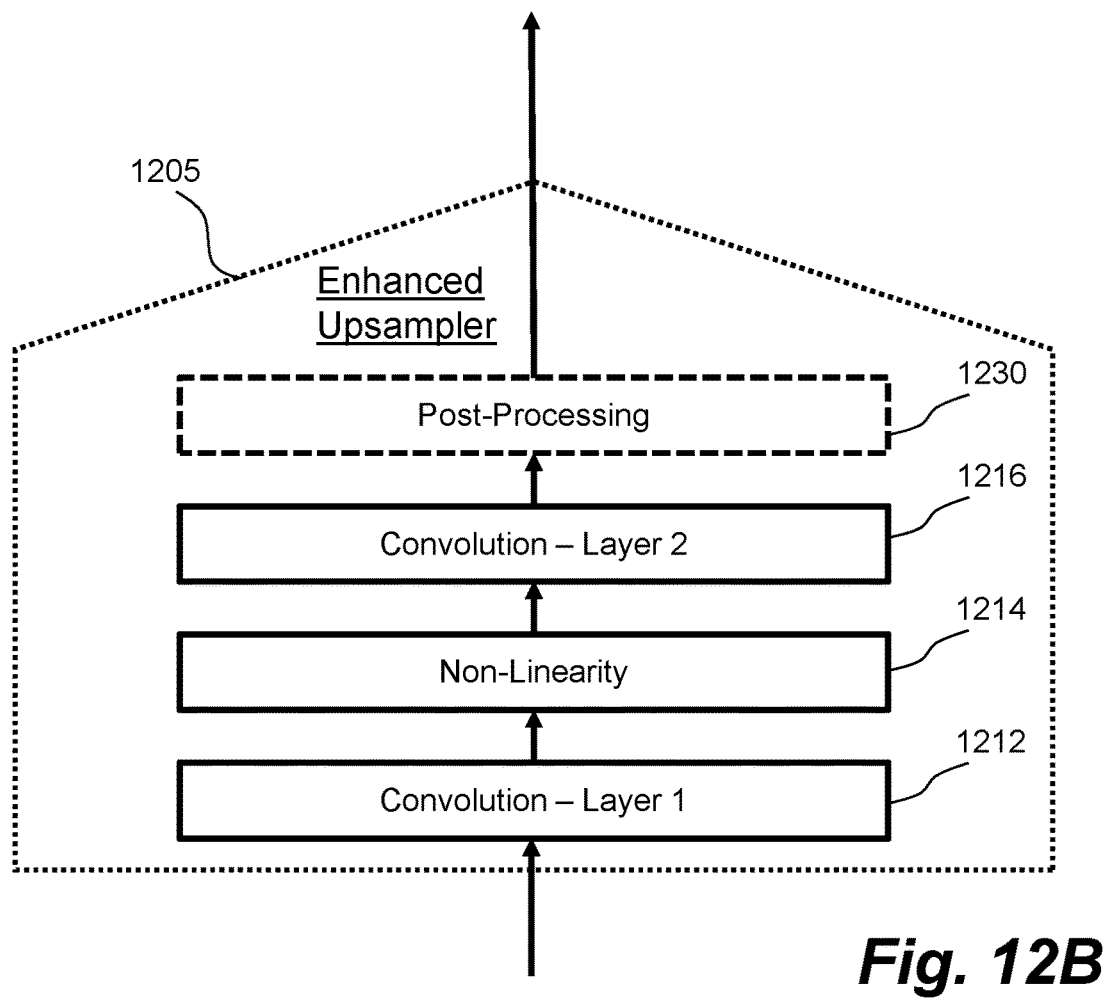

FIG. 12B shows the enhanced upsampler 1205 in more detail. In this example, the neural network up-sampler 1210 comprises two layers 1212, 1216 separated by a non-linearity 1214. By simplifying the neural network architecture to have this structure, up-sampling may be enhanced while still allowing real-time video decoding. For example, processing of a frame may take around 1 ms, which may allow for decoding at frame rates of 30 Hz and 60 Hz (e.g., frames every 33 ms and 16 ms respectively).

The convolution layers 1212, 1216 may comprise a two-dimensional convolution. The convolution layers may apply one or more filter kernels with a predefined size. In one case, the filter kernels may be 3×3 or 4×4. The convolution layers may apply the filter kernels, which may be defined with a set of weight values, and may also apply a bias. The bias is of the same dimensionality as the output of the convolution layer. In the example of FIG. 12B both convolution layers 1212, 1216 may share a common structure or function but have different parameters (e.g., different filter kernel weight values and different bias values). Each convolution layer may operate at a different dimensionality. The parameters of each convolution layer may be defined as a four-dimensional tensor of size—(kernel_size_1, kernel_size_2, input_size, output_size). The input of each convolution layer may comprise a three-dimensional tensor of size—(input_size_1, input_size_2, input_size). The output of each convolution layer may comprise a three-dimensional tensor of size—(input_size_1, input_size_2, output_size). The first convolution layer 1212 may have an input_size of 1, i.e. such that it receives a two-dimensional input similar to a non-neural up-sampler as described herein. Example values for these sizes are as follows: kernel_size1 and kernel_size2=3; for the first convolutional layer 1212, input_size=1 and output_size=16; and for the second convolutional layer 1216, input_size=16 and output_size=4. Other values may be used depending on the implementation and empirical performance. In the case that the output size is 4 (i.e. four channels are output for each input element), this may be refactored into a 2×2 block representing the up-sampled output for a given picture element. The parameters of each convolutional layer including one or more of layer sizes, filter kernel weight values and bias values may be signalled using the signalling methods described herein (e.g., via embedded coefficient signalling and/or SEI messages).

The input to the first convolution layer 1212 may be a two-dimensional array similar to the other up-sampler implementations described herein. For example, the neural network up-sampler 1210 may receive portions of a reconstructed frame and/or a complete reconstructed frame (e.g., the base layer plus a decoded output of the level 1 enhancement). The output of the neural network up-sampler 1210 may comprise a portion of and/or a complete reconstructed frame at a higher resolution, e.g. as per the other up-sampler implementations described herein. The neural network up-sampler 1210 may thus be used as a modular component in common with the other available up-sampling approaches described herein. In one case, the selection of the neural network up-sampler, e.g. at the decoder, may be signalled within user data as described herein, e.g. in a flag within a header portion of the user data.

The non-linearity layer 1214 may comprise any known non-linearity, such as a sigmoid function, a tan h function, a Rectified Linear Unit (ReLU), or an Exponential Linear Unit (ELU). Variations of common functions may also be used, such as a so-called Leaky ReLU or a Scaled ELU. In one example, the non-linearity layer 1214 comprises a Leaky ReLU—in this case the output of the layer is equal to the input for values of input greater than 0 (or equal to 0) and is equal to a predefined proportion of the input, e.g. a*input, for values of the input less than 0. In one case, a may be set as 0.2.

In the example of FIG. 12B, the convolution layers 1212, 1216 and the post processing operation 1230 may be considered a cascade of linear operations (with intermediate non-linear operations). As such the general configuration may be similar to the cascade of linear operations shown in FIG. 11B. In both cases, filter parameters (e.g., filter coefficients) may be transmitted via the signal processing information described herein.

In one case, the neural network upsampler 1210 may be incompatible with the predicted average modification performed by component 1120. As such, use of the neural network upsampler 1210 may be signalled by the encoder by setting a predicted_residual_mode_flag in a Global Configuration Header of the encoded data stream to 0 (e.g., may be used when the predicted residual mode is turned off). In one case, use of the neural network upsampler 1210 may be signalled via a predicted_residual_mode_flag value of 0 plus a set of layer coefficient values that are transmitted via user data such as embedded transformed coefficients and/or SEI user data.

In one variation of the neural network upsampler, the post-processing operation 1230 may comprise an inverse transform operation. In this case, the second convolution layer 1216 may output a tensor of size (size_1, size2, number_of_coefficients)—i.e. the same size as the input but with a channel representing each direction within a directional decomposition. The inverse transform operation may be similar to the inverse transform operation that is performed in the level 1 enhancement layer. In this case, the second convolution layer 1216 may be seen as outputting coefficient estimates for an up-sampled coding unit (e.g., for a 2×2 coding block, a 4-channel output represents A, H, V and D coefficients). The inverse transform step then converts the multi-channel output to a two-dimensional set of picture elements, e.g. an [A, H, V, D] vector for each input picture element is converted to a 2×2 picture element block in level n. The inverse transform may comprise setting values that a coefficient that carries user data (e.g., H or HH) to zero before performing the conversion.

The parameters of the convolutional layers in the above examples may be trained based on pairs of level (n−1) and level n data. For example, the input during training may comprise reconstructed video data at a first resolution that results from applying one or more of the encoder and decoder pathways, whereas the ground truth output for training may comprise the actual corresponding content from the original signal (e.g., the higher or second resolution video data rather than up-sampled video data). Hence, the neural network up-sampler is trained to predict, as closely as possible, the input level n video data (e.g., the input video enhancement level 2) given the lower resolution representation. If the neural network up-sampler is able to generate an output that is closer to the input video that a comparative up-sampler, this will have a benefit of reducing the level 2 residuals, which will further reduce the number of bits that need to be transmitted for the encoded level 2 enhancement stream. Training may be performed off-line on a variety of test media content. The parameters that result from training may then be used in an on-line prediction mode. These parameters may be communicated to the decoder as part of an encoded bytestream (e.g., within header information) for a group of pictures and/or during an over-the-air or wire update. In one case, different video types may have different sets of parameters (e.g., movie vs live sport). In one case, different parameters may be used for different portions of a video (e.g., periods of action vs relatively static scenes).

Figures 13, 14:
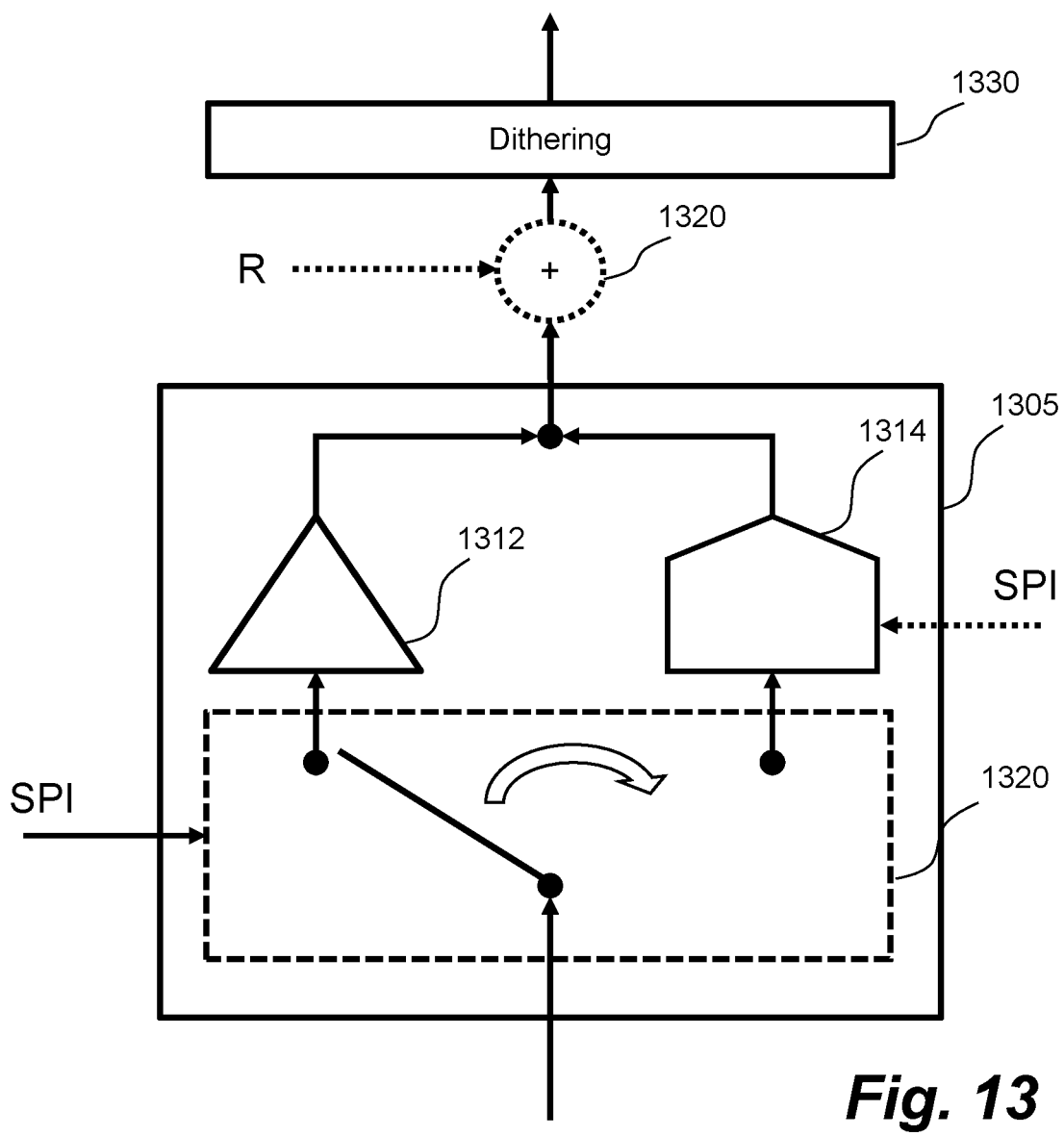
FIG. 13 shows a high-level schematic of switching between normal and enhanced upsampling operation according to an example.
FIG. 14 shows an example sharpening filter.

FIG. 13 shows a schematic illustration of how the enhanced upsampler 1105 or 1205 may be implemented based on signal processing information (SPI) extracted from an encoded data stream. FIG. 13 shows a switching arrangement wherein different forms of upsampling operation are performed depending on the signal processing information (i.e. an enhanced upsampling operation is selectively performed based on the information).

In FIG. 13, the upsampling operation is shown as block 1305. The upsampling operation 1305 receives data to upsample as per the upsampling operations of FIGS. 1 to 7. Within the upsampling operation 1305 there are at least two possible upsampling configurations—a standard upsampler 1312 and an enhanced upsampler 1314. The enhanced upsampler 1314 may be the enhanced upsampler 1105 or 1205. A switch 1320 then receives the signal processing information, which may comprise flag values indicating whether the enhanced upsampler 1314 is to be used (e.g., as signalled from an encoder or as additional determined based on current operating conditions as described above). A default mode may be to use the standard upsampler 1312 (e.g., as shown in the Figure). The arrow indicates that on receipt of suitable signal processing information the switch 1320 may be activated to divert upsampling via the enhanced upsampler 1314. As shown in the Figure, the enhanced upsampler 1314 may further receive signal processing information to configure the enhanced upsampler 1314 (e.g., at one or more of a local or global basis with respect to coding units of a frame). Both the standard upsampler 1312 and the enhanced upsampler 1314 provide an output for the upsampling operation 1305.

In this example, residual data (R) is added after the upsampling operation 1305, i.e. after any enhancement operations, at block 1320. As a last operation, dithering 1330 may be applied to the final output before display. In certain circumstances or configurations, e.g. if there is network congestion such that residual data is not receivable and/or if the upsampling operation 1305 is enacted as an "extra" upsampling operation that is applied to the output of a standard decoding process, no residual data may be added at block 1320 (or block 1320 may be omitted). If the upsampling operation 1305 is enacted as an "extra" upsampling, then the enhanced upsampler 1314 may provide a super-resolution output. In these cases, image quality is improved by adding the dithering at the highest possible output resolution (e.g., the upscaled resolution beyond the standard output resolution as produced by the enhanced upsampler 1314).

FIG. 14 shows an example unsharp mask 1400 that may be used to implement a sharpening filter, such as post-processing operations 1130 or 1132 in FIGS. 11A and 11B. The sharpening filter may only be applied to one colour component of a video frame, in a preferred example, the luminance or Y plane to generate a filtered luminance plane. The sharpening filter may not be applied to U or V chroma planes.

The sharpening filter of FIG. 14 may be implemented as a convolution of the input image f and a weighted Laplacian kernel L:

$$z = f * L$$

where f is the input image, z is the output (filtered) image, and L is the filter kernel as shown in FIG. 14. In FIG. 14, S and C are parameters that control the effect of the sharpening filter. In one case, S may be 1 and only C may be controlled. In other cases, C=4S+1. In both of these cases, only one parameter value (S or C) may need to be signalled. In these cases, the signalled parameter may comprise an integer value or a floating point value. In certain cases, $0 \leq S \leq 1$, with S=0 corresponding to no filtering effect (i.e. z=f) and s=1 resulting in the strongest filtering effect. The value of S (and/or C) may be chosen either by a user configuration or it may be set dependent on the content being processed. In the latter case, the value of S or C may be varied per coding block, and as such may be signalled in embedded transformed coefficient signalling for the coding block (e.g., within user data for the coding block). The filter may be called an unsharp mask, as it uses a negative blurred (or unsharp) version of an image as a mask to perform the sharpening, the mask being subsequent combined with the original image. In other examples, the sharpening filter may comprise any linear and/or non-linear sharpening filter.

Examples of User Data Signalling

As described in examples herein, a signal processor (e.g., computer processor hardware) is configured to receive data and decode it ("decoder"). The decoder obtains a rendition of the signal at a first (lower) level of quality and detects user data specifying optional upsampling and signal enhancement operations. The decoder reconstructs a rendition of the signal at the second (next higher) level of quality based at least in part on the user data. Certain examples of the user data will now be described in more detail.

In a first set of examples, signal processing information is embedded in one or more values received in one or more encoded data layers transmitted within the stream of encoded data. The values are associated with transformed coefficients that are processed to derive elements of the signal during the decoding, e.g. they may comprise values for a predefined transformed coefficient within a set of different transformed coefficients that are generated by an encoding transform.

For example, a bit in a bitstream for the encoded data stream may be used to signal the presence of user data in place of one of the coefficients associated with a transform block (e.g., the HH coefficient specifically in the case of a 4×4 transform). The bit may comprise a user_data_enabled bit, which may be present in a global configuration header for the encoded data stream.

In certain examples, an encoding of user data in place of one of the coefficients may be configured as follows. If the bit is set to "0", then the decoder shall interpret that data as the relevant transform coefficient. If the bit is set to "1", then the data contained in the relevant coefficient is deemed to be user data, and the decoder is configured to ignore that data—i.e., decode the relevant coefficient as zero.

User data transmitted in this manner may be useful to enable the decoder to obtain supplementary information including, for example, various feature extractions and derivations. Although claimed examples herein relate to optional upsampling and signal enhancement operations, it is also possible to use the user data to signal other optional parameters that relate to implementations outside of a standardised implementation.

In one case, a user_data_enabled variable may be a k-bit variable. For example, the user_data_enabled may comprise a 2-bit variable with the following values:

| user_data_enabled | Value of type |
| --- | --- |
| 0 | disabled |
| 1 | enabled 2-bits |
| 2 | enabled 6-bits |
| 3 | reserved |

In this case, the user data specifying optional upsampling and signal enhancement operations may be embedded into the last u significant bits of one or more of the decoded coefficient data sets (e.g., within the encoded residual coefficient data).

When user data is enabled, e.g. to transmit signal processing information as described in examples herein, then the "in-loop" processing of transformed coefficients may be modified. Two examples of this are shown in FIGS. 8A and 8B. Further, the decoding of the transformed coefficients may also be adjusted such that, when the user data is enabled, values of the particular transformed coefficient (e.g., H or HH) are set to 0 before the transformed coefficients are subject to an inverse transform. In the case set out in the table above, values of the transformed coefficient used to carry the user data may be shifted right (e.g., bit shifted) by 2 bits (>>2) if 2-bits are used (e.g., user_data_enabled=1) or shifted right (e.g., bit shifted) by 6 bits (>>6) if 6-bits are used (e.g., user_data_enabled=1). In one case, if the values of the transformed coefficients are b-bits in length, where b>u, u being the length of the user data in bits (e.g., 2 or 6 in the table above), then the remaining b-u bits for the transformed coefficient may be used to carry a value for the transformed coefficient (e.g., a more heavily quantised integer value compared to a full b-bit representation). In this case, the user data and the value for the transformed coefficient may be partitioned across the b-bits. In other simpler cases, the user data may be extracted and the value of the transformed coefficient may be set to 0 (i.e. such that the value of the transformed coefficient has no effect on the output of the inverse transform).

In certain examples, the user data may be formatted according to a defined syntax. This defined syntax may partition the user data into header data and payload data. In this case, decoding of the user data may comprise parsing a first set of values received in one or more encoded data layers to extract the header data and parsing a second subsequent set of values received in one or more encoded data layers to extract the payload data. The header data may be set as a first set of a defined number of bits. For example, in the examples above with user data being defined in 2- or 6-bit values, the first x values may comprise the header data. In one case, x may equal 1, such that the first value for the user data (e.g., the transformed coefficient value for the first coding unit or data block of a given frame or plane of video) defines the header data (e.g., the 2- or 6-bits of the first value defines the header data).

In certain examples, the header data may indicate at least whether optional upsampling and signal enhancement operations are enabled and whether any other user data is signalled. In the latter case, after user data relating to optional upsampling and signal enhancement operations has been signalled, remaining values within the defined transformed coefficient may be used to transmit other data (e.g., not related to optional upsampling and signal enhancement operations). In a case with 2-bit user data values, these two variables may be signalled using two 1-bit flags. In a case with 6-bit user data values, one or more types of optional upsampling and signal enhancement operations may be signalled (e.g., using a 3-bit integer to index look-up table values) and a 1-bit flag may indicate whether the user data also contains additional post-processing operations. In this case, the type may indicate which type of neural network upsampler is to be used and the 1-bit flag may indicate whether a sharpening filter is to be applied. It will be understood that different combinations of formats may be used, e.g. 6-bit values may be constructed from 3 successive 2-bit values etc.

In general, the header data may indicate global parameters for the signal processing information and the payload data may indicate local parameters for the signal processing information. The split between global parameters and local parameters may also be implemented in other ways, e.g. global parameters may be set within SEI message user data whereas local parameters may be set within embedded transformed coefficient values. In this case, there may be no header data within the embedded transformed coefficient values as header data may instead be carried within the SEI message user data.

Certain user data implementation examples will now be described with respect to the LCEVC standard. It should be noted that similar syntax may be used with other standards and implementations. In these examples, the optional signal enhancement operations are referred to as a "super-resolution" mode. For example, if the described neural network upsampler is used, this may be said to produce a "super-resolution" upscaling, whereby a level of detail in the higher resolution picture frame is greater than a naïve comparative upsampling (e.g., the neural network is configured to predict additional details in the higher resolution picture frame).

In certain examples, the signal comprises a video signal and a first header structure is used for an instantaneous decoding refresh (IDR) picture frame and a second header structure is used for a non-IDR picture frame. In this case, the IDR picture frame may carry a global user data configuration whereas following non-IDR picture frames may carry locally applicable user data (e.g., data associated with the particular non-IDR picture frame). An IDR picture frame comprise a picture frame where the encoded data stream contains a global configuration data block, where the picture frame does not refer to any other picture for operation of the decoding process of the picture frame and for which no subsequent picture frames in decoding order refer to any picture frame that precedes the IDR picture frame in decoding order. An IDR picture shall occur at least when an IDR picture for the base decoder occurs. In one implementation, the locally applicable user data may be signalled as one or more changes or deltas from information signalled within the global user data configuration.

In a 6-bit user data implementation that is compatible with LCEVC, the first bits of user data may be structured as follows, so as to make the signalling suitable for embedding user data in groups of 6 bits (in the table, u(n) indicates a number of unsigned bits used for the variables indicated in bold):

TABLE 1

6-bit User Data for LCEVC - Global User Data Configuration for IDR frames

| Syntax | Descriptor |
| --- | --- |
| user_data_payload_global_config(payload_size) { | |
|    optional_super-resolution_type | u(3) |
|    s_configuration_data_signalled_flag | u(1) |
|    optional_post-processing_operations_signalled_flag | u(1) |
|    other_user_data_signalled_flag | u(1) |
|    if (s_configuration_data_signalled_flag == 1) { | |
|      super-resolution_configuration_data | u(6) |
|    } else { | |
|      super-resolution_configuration_data = <default> | |
|    } | |
|    if (optional_post-processing_operations_signalled_flag == 1) { | |
|      optional_post-processing_operations_configuration_data | u(6) |
|    } else { | |
|      optional_post-processing_operations_configuration_data = 0 | |
|    } | |
|    if (other_user_data_signalled_flag == 1) { | |
|      other_user_data_configuration_data | u(6) |

TABLE 1-continued 6-bit User Data for LCEVC - Global User Data Configuration for IDR frames

| Syntax | Descriptor |
|---|---|
|   } else { <br>     other_user_data_configuration_data = 0 <br>   } | |

In a 2-bit user data implementation that is compatible with LCEVC, the first bits of user data may be structured as follows, so as to make the signalling suitable for embedding user data in groups of 2 bits:

TABLE 2

2-bit User Data for LCEVC - Global User Data Configuration for IDR frames

| Syntax | Descriptor |
|---|---|
| user_data_payload_global_config(payload_size) { | |
|   optional_super-resolution_signalled_flag | u(1) |
|   other_user_data_signalled_flag | u(1) |
|   if (optional_super-resolution_signalled_flag == 1) { | |
|     super-resolution_type | u(2) |
|   } else { | |
|     super-resolution_type = <default> | |
|   } | |
|   if (super_resolution_type == 2 \|\| super_resolution_type == 3) { | |
|     super-resolution_configuration_data | u(6) |
|   } else { | |
|     super-resolution_configuration_data = <default> | |
|   } | |
|   if (other_user_data_signalled_flag == 1) { | |
|     other_user_data_type | u(2) |
|   } else { | |
|     other_user_data_type = <default> | |
|   } | |
| } | |

In the above examples that embed the user data in a LCEVC stream according to the LCEVC embedded user data syntax, user data configuration information, as shown by example in Table 1 or Table 2, is extracted by the decoder from the user data bits of the first coefficients of an IDR frame. In certain cases, a user data configuration (e.g., the User_Data_Configuration above) defined for a picture frame is maintained until a subsequent IDR frame. In other cases, it is possible to signal a change in the user data configuration for non-IDR frames, by means of a flag bit in the first user data bits (e.g., for LCEVC, the user data bits of the first coefficients within the embedded user data) of non-IDR frames. A example in the context of the 2-bit case of Table 2 is shown in Table 3 below:

Although in the examples above, the format in which the residual data and the embedded contextual information are encoded is LCEVC, in other examples, the format in which the residual data and the embedded contextual information are encoded may be VC-6 or another signal coding standard.

In the above examples, a value in "optional super-resolution type" variable of the first user data byte may be set to signal the optional use of a sharpening filter (e.g., a modified unsharp masking filter as described above) in cascade with a separable upsampling filter and the application of predicted residuals (e.g. as indicated in FIG. 11B). The sharpening filter may be applied before applying residual data of the higher residual sub-layer and before applying statistical dithering (e.g. as indicated in FIG. 13). Another value in "optional_super-resolution_type" may be set to signal the optional use of the same sharpening filter but after applying

TABLE 3

2-bit User Data for LCEVC - User Data Picture Configuration for non-IDR frames

| Syntax | Descriptor |
|---|---|
| user_data_payload_picture_config(payload_size) { | |
|   change_super-resolution_configuration_data_flag (default = 0) | u(1) |
|   change_user_data_configuration_flag (default = 0) | u(1) |
|   if (change_super-resolution_configuration_data_flag == 1) { | |
|     super-resolution_configuration_data | u(6) |
|   } else { | |
|     super-resolution_type = <continue using configuration as previous frame> | |
|   } | |
| } | | residual data of the higher residual sub-layer. For example, in one mode, the addition of residuals at block 1320 may be performed after block 1120 of FIG. 11B but prior to block 1132 of FIG. 11B. The sharpening filter in this mode may still be applied before (optionally) statistical dithering. This mode may allow backward compatibility with decoders unable to understand the signalling or process the filter, e.g. may allow the sharpening filter to be modularly applied out-of-loop. In other examples, in absence of any specified "super-resolution_configuration_data" as set out above (i.e., s_configuration_data_signalled=0), a sharpening filter may be applied with a default configuration and strength, while if "super-resolution_configuration_data" is signalled, this data may comprise information on the configuration and strength of the filter to be applied.

Similarly, in certain examples, another value in "optional_super-resolution_type" of the first user data byte above may correspond to signalling the optional use of a convolutional neural network (e.g., as described with reference to FIGS. 12A and 12B), as an alternative to separable upsampling filter and application of predicted residuals, and before applying residual data of the higher residual sub-layer but before applying optional and signalled statistical dithering. This may be a mode that is used with the modes above (e.g. part of a plurality of available modes to be signalled) and independently of those modes. In certain examples, in absence of any specified "super-resolution_configuration_data" (i.e., s_configuration_data_signalled=0), a convolutional neural network filter (e.g., as described herein) may be applied with a default configuration and set of coefficients, while if "super-resolution_configuration_data" is signalled, the additional data within the user data comprises information on the configuration and set of coefficients of the filter to be applied.

In certain examples, the convolutional neural network upsampling described herein may be used for a plurality of upsampling passes. For instance, LCEVC may define a scaling mode that indicates whether upsampling is to be used for multiple tiers in the tier-based hierarchical format (e.g. more similar to the VC-6 style examples of FIGS. 2 and 3). To signal this a "scaling_mode" parameter may be defined as part of the LCEVC standard. Values of this parameter may indicate whether scaling is to be applied (e.g. 0=not applied) and whether it is to be applied in one or two dimensions (e.g. 1=one dimension and 2=two dimensions, or 1=horizontal scaling, 2=vertical scaling and 4=scaling in both horizontal and vertical dimensions). In this case, if for an LCEVC implementation "scaling_mode_level1"=2 and "scaling_mode level2"=2 (e.g. indicating two dimensional scaling), convolutional neural network upsampling may be used to first reconstruct a preliminary picture at level 1 resolution (with 2:1 scaling in both directions, in this non-limiting example case) and then—after addition of sub-layer 1 residual data corrections, if present—reconstruct a preliminary picture at level 2 resolution. In these cases, the default configurations of the networks used for each upscaling process (i.e., level 1 vs. level 2) may differ, where the signalled "super-resolution_configuration_data" specifies distinct configuration data for the two upscaling processes.

As an alternative to the embedded transformed coefficient examples above, or in combination with those examples, user data specifying optional upsampling and signal enhancement operations may be packaged into SEI (supplementary enhancement information) messages.

In video coding implementations, SEI messages are typically used to convey information relating to colour and light levels, e.g. for a reconstructed video to be displayed. While SEI messages may be used to assist in processes related to decoding, display or other purposes, they may not be required for constructing the luma or chroma samples by a standard decoding process. The use of SEI messages may thus be seen as an optional variation to allow for increased functionality.

In the present examples, SEI messages may be configured to carry the signal processing information that is used to signal the optional enhancement operations. For example, one or more of "reserved" or "user data" portions of a defined SEI message syntax may be used to carry this signalling information. SEI messages may be present in a bitstream of an encoded data stream and/or conveyed by means other than presence within the example bitstreams described herein.

An example syntax for decoding an SEI payload when used with LCEVC is shown below (where u(n) indicates an unsigned integer of n-bits as set out above and f(n) indicates a fixed-pattern bit string):

TABLE 4

General SEI message syntax

| Syntax | Descriptor |
|---|---|
| sei_payload(payloadType, payloadSize) { | |
|   if (payloadType == 1) | |
|     mastering_display_colour_volume(payloadSize) | |
|   else if (payloadType == 2) | |
|     content_light_level_info(payloadSize) | |
|   else if (payloadType == 3) | |
|     user_data_registered_itu_t_t35(payloadSize) | |
|   else if (payloadType == 4) | |
|     user_data_registered(payloadSize) | |
|   Else | |
|     reserved_sei_message(payloadSize) | |
|   if (more_data_in_payload( )) { | |
|     if (payload_extension_present( )) | |
|       reserved_payload_extension_data | u(v) |
|       payload_bit_equal_to_one /* equal to 1 */ | f(1) |
|     while (!byte_aligned( )) | |
|       payload_bit_equal_to_zero /* equal to 0 */ | f(1) |
|   } | |
| } | |

In this case, signalling for the present examples may be carried within one or more of registered user data, unregistered user data and reserved data within SEI messages. Examples of a syntax for unregistered user data and reserved data are shown below:

TABLE 5

User data unregistered SEI message syntax

| Syntax | Descriptor |
|---|---|
| user_data_unregistered( payloadSize ) { | |
|   uuid_iso_iec_11578 | u(128) |
|   for( i = 16; i < payloadSize; i++) { | |
|     user_data_payload_byte | b(8) |
|   } | |
| } | |

TABLE 6

Reserved SEI message syntax

| Syntax | Descriptor |
|---|---|
| reserved_sei_message(payloadSize) { | |
|   for(i = 0; i < payloadSize; i++) | b(8) |
|     reserved_sei_message_payload_byte | |
| } | |

The user data unregistered SEI messages may be preferred. In certain cases, a header may be used to identify signal processing information related to enhancement operations. For example, a universally unique identifier (UUID) may be used to identify a particular type of signal processing information. In one case, a sharpening filter or a neural network upsampler to be applied may have their own UUIDs, which may be 16-byte values. Following the UUID the payload data described below may be present.

If used within LCEVC, the following syntax within LCEVC may be used to process the SEI messages:

TABLE 7

Processing a payload of additional info

| Syntax | Descriptor |
|---|---|
| process_payload_additional_info(payload_size) { | |
|   additional_info_type | u(8) |
|   if (additional_info_type == 0) { | |
|     payload_type | u(8) |
|     sei_payload(payload_type, payload_size − 2) | |
|   } else if (additional_info_type == 1) | |
|     vui_parameters (payload_size − 1) | |
|   else // (additional_info_type >= 2) | |
|     // reserved for future use | |
| } | |

SEI messages have an advantage of being processed before a decoding loop for received data. As such they may be preferred when transmitting global configuration for optional enhancement operations (e.g. as there may be more time to configure these enhancement operations before frame data is received). For example, SEI messages may be used to indicate the use of a sharpening filter as described herein. In certain cases, if local signal processing information is also required, this may be advantageously carried within the embedded transformed coefficients, where the signal processing information may be decoded and accessed within loop (e.g. for one or more coding units or data blocks). In certain cases, a combination of SEI messages and embedded coefficient data may have a synergistic effect, e.g. may provide advantages over the use of these separately, combining the advantages of global and local processing and availability. For example, use of a sharpening filter may be indicated by way of SEI messages and a coding-unit dependent value for S (where C=4S+1) for the sharpening filter of FIG. 14 may be transmitted within the transformed coefficient values.

In addition to, or instead of, the embedded transformed coefficient and SEI methods described above, a further signalling approach may be to signal an optional upsampling method to the decoder by way of a specific combination of standard upsampling method signalling. For example, a decoder may be configured to apply an optional upsampling method based on a particular combination of parameters that are defined within a standard bitstream such as LCEVC or VC-6. In one case, an optional upsampling method may be signalled to the decoder by signalling to turn off a predicted residuals mode in combination with a specific custom configuration of the kernel coefficients of the standard upsampling method. For example, the simplified neural network upsampler may be implemented by setting a predicted residual mode flag to 0 and signalling the coefficients for the simplified neural network upsampler (or other parameters) within the syntax specified for non-neural network upsamplers that form part of LCEVC.

In certain implementations, a payload of data for the configuration of the one or more signal processing operations may be agnostic to the method by which this data is transmitted within the bitstream. For example, the payload may be transmitted in a similar manner within embedded transformed coefficient values and/or within SEI messages.

In an LCEVC example, the payload may be transmitted at a frequency equivalent to the frequency of the "Global Configuration" block in the LCEVC bitstream. This allows certain aspects of the signal processing operations to be updated per group-of-pictures (GOP). For example, the sharpening filter strength and/or the type of sharpening filter to apply may be updated at a per-GOP update frequency, including an ability to disable the sharpening filter for a full GOP. A GOP may comprise the group of frames associated with a given IDR picture frame.

In certain examples, if the payload that carries signal processing information for the one or more signal processing operations is not signalled, then it may be assumed that the one or more signal processing operations are disabled and/or default operations are to be applied in their place. For example, if the payload is not present it may be assumed a sharpening filter is not to be used and/or that a per-standard upsampler is to be used in place of a neural network upsampler. This then enables an encoded data stream to behave as per a standard specification (e.g. LCEVC or VC-6) without unexpected signal modification.

Syntax for an example payload for a sharpening filter is described below. This payload is one byte (8-bits), with the first 3-bits for a type definition and the following 5-bits for configuration data.

TABLE 8

Sharpening (S)-Filter Configuration

| Syntax | Descriptor |
|---|---|
| s_filter_payload_global_config(payload_size) { | |
|   super_resolution_type | u(3) |
|   if(super_resolution_type >= 2) { | |
|     super_resolution_configuration_data | u(5) |
|   } else { | |
|     reserved_zeros_5bit | u(5) |
|   } | |
| } | |

In this example, the super_resolution_type variable defines the behaviour of the sharpening filter with respect to default values as well as the location during decoding and encoding where the filtering is applied. An example of a set of super resolution types is set out in the table below.

TABLE 10

Sharpening Filter Type

| Type Value | Description |
|---|---|
| 0 | Sharpening filter with default strength, applied after L-2 residuals are added (i.e., out of loop) and before dithering |
| 1 | Sharpening filter with default strength, applied before L-2 residuals (i.e., in loop, also at the encoder) and before dithering |
| 2 | Sharpening filter with custom strength (specified in the next 5 bits of user data), applied after L-2 residuals (i.e., out of loop) and before dithering and predicted average |

TABLE 10-continued

Sharpening Filter Type

| Type Value | Description |
|---|---|
| 3 | Sharpening filter with custom strength (specified in the next 5 bits of user data), applied before L-2 residuals (i.e., in loop, also at the encoder) and before dithering and predicted average |
| 4-7 | Reserved |

For types 2 and onwards in the example above, the following 5 bits of payload data specify the strength of the sharpening filter to be applied. The sharpening filter application may use a real number to determine a weighting for the filter. For the cases of 0 and 1 above a strength is not signalled and a default real value of 0.15 may be used. In this example, the following 5 bits of payload data may comprise the variable super_resolution_configuration_data, which defines the strength of the sharpening filter. In one case, the 5 bits may define an unsigned integer value with a numerical range between 0 and 31 inclusive. This may then be converted to a real number for configuring the strength of the sharpening filter using:

S-Filter Strength=(super_resolution_configuration_data+1)*0.1

In cases where the sharpening filter strength changes, this may be signalled as embedded transformed coefficient values as described herein. A first level of configuration may be set by variables transmitted with an IDR picture frame that are maintained for a GOP. This configuration may be assumed to apply unless overwritten by values transmitted within the one or more embedded transformed coefficients. For example, a new super_resolution_configuration_data value may be transmitted or a signed change in the GOP super_resolution_configuration_data value may be transmitted (e.g. original GOP super_resolution_configuration_data+/−m where m is transmitted in the user data).

In LCEVC, the SEI messages may be encapsulated within an "additional information" block within the LCEVC bitstream (e.g., as shown in Table 7 with respect to the SEI messages). Within the LCEVC standard, the additional information block may carry SEI data and video usability information (VUI) data. In one case, e.g. as an alternative to using SEI messages, the signal processing information may be carried in this "additional information" block. In the LCEVC standard, it may be defined that the "additional information" block may be skipped by a decoder if the decoder does not know the type of data within the block. This may be possible by defining the block as a pre-defined size (e.g. 1 byte). An "additional information" block may be of a reduced size as compared to an SEI message (e.g. 3 bytes of overhead compared to 21 bytes if a 16-byte UUID is used for the SEI messages). An approach may be configured based on one or more of: an overall data-rate of an encoded data stream and a GOP length.

Other Variations

Certain other variations of the examples described herein will now be described.

In the case that an optional super-resolution mode is signalled, this may be selectively performed as described above based on a metric of available processing power at the decoder. In this case, the decoder decodes the configuration of optional super-resolution (e.g. from user data as described above) but performs upscaling and preliminary signal reconstruction operations based on a lower-complexity separable upsampling method (e.g. switch 1320 in FIG. 13 is set to conventional upsampler 1312 rather than enhanced upsampler 1314), with application of predicted residuals being performed as specified by the main syntax of the stream (e.g. as per block 1120 in FIGS. 11A and 11B). In this way, a same stream sent to a same decoder can seamlessly be decoded at higher quality when decoded on more powerful hardware or when the hardware has more resources available for the processing (e.g., absence of other power-hungry apps running in parallel, relatively full battery, etc.), while it can automatically save processing power and battery consumption by defaulting to simpler upsampling methods and decoding with lower processing power requirements when decoding on a hardware with lower availability of processing resources. This allows to signal and adopt relatively sophisticated methods, while at the same time guaranteeing suitable backward compatibility with lower-power devices by signalling a suitable backup or default upscaling kernel to be used in alternative to the more sophisticated super-resolution method.

In another example, a signal processor (e.g., computer processor hardware) is configured to receive data and encode it (i.e. is configured as an "encoder"). The encoder produces a downsampled rendition of the source signal at a first (lower) level of quality, according to a first downsampling method. It then produces, based on the downsampled rendition of the signal at the first level of quality, a predicted rendition of the signal at a second (higher) level of quality according to a first upsampling method, and correspondingly analyses the residual data that would be necessary to suitably reconstruct the source signal (e.g. at a predefined level of difference, which may be a difference of 0 representing a "perfect" reconstruction). Based on a metric generated at least in part by processing the residual data, the encoder selects a second combination of downsampling method and upsampling method to be used to process the signal. In some non-limiting embodiments, when the optimal upsampling method is not supported in the roster of standard upsampling methods offered by the coding format, the encoder signals to the decoder a default upsampling method for backward compatibility and the upsampling method in the user data as optional.

In certain examples, the process of selecting a downsampling and upsampling method is iterated a plurality of times, according to a process aimed at optimizing a metric generated at least in part by processing the residual data produced at each iteration. In certain examples, the metric to be optimized may also depend at least in part on the bitrate available to encode residual data.

In certain examples, an encoder may produce a rendition of the signal at a first (lower) level of quality according to a first downsampling method and also encodes it with a first coding method before producing a predicted rendition of the signal at a second (higher) level of quality according to a first upsampling method, in order to produce a more accurate metric generated at least in part from the residual data necessary to suitably reconstruct the source signal. In one case, the process is iterated a plurality of times in order to optimize the metric generated at least in part from the residual data.

In some certain examples, downsampling methods may include non-linear downsampling methods obtained by cascading linear downsampling methods (e.g., by way of example, separable 12-tap filters with custom kernel coefficients) with at least one image processing filter. For example, these may be downsampling methods that correspond to the cascaded linear upsampling methods described with reference to FIGS. 10A to 14. In other examples, downsampling methods, e.g. at the encoder, may include methods leveraging convolutional neural networks as per the described upsampling methods. As discussed previously, upsampling and downsampling methods at the encoder may be asymmetrical as the residual data may be used to compensate for differences in an output that results from downsampling and then upsampling and the original signal that is fed to the downsampling. In this case, upsampling may prefer simpler methods that may be implemented on lower resource decoders.

In certain examples a method of encoding a signal comprises: encoding a lower resolution tier of a tier-based hierarchical format (e.g. a level 1 encoding in FIG. 6); encoding a higher resolution tier of a tier-based hierarchical format, the higher resolution tier being encoded using data generated during the encoding of the lower resolution tier (e.g. a level 2 encoding in FIG. 6); and generating an encoded data stream using an output of the encoding of the lower resolution tier and an output of the encoding of the higher resolution tier. This method may further comprise determining signal processing information for one or more signal processing operations that are performed to enhance data within the higher resolution tier, the one or more signal processing operations being performed as part of a reconstruction of the higher resolution tier using the data generated during the encoding of the lower resolution tier and encoding the signal processing information as part of the encoded data stream.

In certain examples, determining signal processing information for one or more signal processing operations comprises: processing a reduced resolution frame for the signal; and determining an optimal signal processing operation for the frame based on the reduced resolution frame. For example, a frame of video may be reduced (e.g. decimated or otherwise passed through a downsampling pyramid as per FIGS. 2 and 3) and then a frame metric computed based on the reduced resolution version of the frame. For example, the metric may indicate a complexity of the frame and thus indicate image processing operations that may generate a reduced bit rate for a set of higher tier residuals. In one case, a quick binary search may be performed using a decimated version of the image, and using one or more metrics as a reference. By applying tests to the computed metrics, an optimal image processing method for the specific frame image may be determined.

In certain examples, a bit in the decoded bytestream may be used to signal to the decoder that additional information may have been embedded in some residual data coefficients, and thus that a specific set of symbols in a specific set of residual data should not be interpreted as actual residual data, but as contextual information to inform signal enhancement operations. In certain cases, instead of parameters for enhancement operations, some reserved symbols may be used to signal specific types of impairments, informing the decoder on postprocessing operations that may be applied to a corresponding area of the signal in order to improve the quality of the final signal reconstruction. In these examples, when detecting that the process of encoding the signal at the first level of quality produces one or more impairments that cannot be suitably corrected with residual data at the target bitrate, an encoder may leverages the set of reserved symbols in a set of residual data of the echelon of residual data at the second level of quality to signal to the decoder the type and/or the location of the impairments it should expect.

Although examples have described the embedding of signalling within one transformed coefficient, in other examples signalling may be embedded in values for more than one transformed coefficient. For example, user data as described herein may be multiplexed across a set of transformed coefficient values for one or more initial lines of pixels that in certain cases may not be visible in a rendered output. As such, in certain examples, contextual information may be embedded in more than one echelon of residual data.

As well as signalling parameters relating to sharpening filters and convolutional neural network upsamplers, contextual signal information (e.g. that is embedded in residual data) may also include data corresponding to blocking impairments. For example, a decoder may implement a deblocking post processing operation in the area of the signal corresponding to the residual coefficient containing the reserved symbol. In certain cases, the contextual signal information may indicate a varying degree of intensity for a decoder deblocking filter. The decoder may deblock the signal by means of a deblocking method such as that described in U.S. Pat. No. 9,445,131B1, "De-blocking and de-banding filter with adjustable filter strength for video and image processing", wherein the QP information for a given neighbouring area is embedded in the symbol (the patent being incorporated herein by reference). In these variations, the decoder may apply the deblocking method in-loop, before applying the residual data decoded from the echelon of data that contains embedded information about blocking impairments. In other cases, the decoder may apply the deblocking method after having combined the preliminary rendition of the signal at the second level of quality with the decoded residual data.

Similar to the deblocking variation described above, in certain variations, contextual signal information (e.g. that is embedded in residual data) includes data that parameterises filtering to correct banding, ringing and softening impairments. In these cases, a decoder may implement signal enhancement operations that include de-banding, de-ranging, edge enhancement, range equalization and sharpening post processing operations in the area of the signal corresponding to the residual coefficient containing the reserved symbol.

In certain variations, contextual signal information (e.g. that is embedded in residual data) includes data corresponding to a risk of chroma flip impairments in case of colour conversion from Wide Colour Gamut to Standard Colour Gamut. For example, said impairments may be due to the limitations of conversion LUTs (for "Look Up Tables"). In one case, before applying colour conversion methods, a decoder clamps colour values in the area of the signal corresponding to the contextual signal information contained within the reserved symbol.

According to certain variations, contextual signal information (e.g. that is embedded in residual data) includes data corresponding to quantization noise impairments. In certain cases, the decoder applies a denoising method in the area of the signal corresponding to the residual coefficient containing the reserved symbol. The denoiser may be applied in-loop or out-of-loop. Similarly, in certain variations, contextual signal information that is embedded in residual data includes data corresponding to loss of film grain and/or camera noise. In certain cases, the decoder applies a statistical dithering method in the area of the signal corresponding to the residual coefficient containing the reserved symbol. In certain implementations, statistical dithering is applied in-loop at multiple levels in a tiered hierarchy, e.g., both at the resolution of the given level of quality and at the resolution of a subsequent (higher) level of quality.

According to certain variations, the embedded information may comprise watermarking information. In one case, the watermarking information may be used to identify and validate the encoder that generated the data stream. In another case, the watermarking information may contain information pertaining the time and location of encoding. In some cases, watermarking information may be useful, for example, to identify the nature of the signal. The watermarking information may indicate that the decoder should initiate application of watermarking of the decoded signal.

In certain variations, user data as described herein (including possible additional user data following signal processing information relating to enhancement operations) may indicate compliance information, which may comprise any of the following information: the way the signal has been generated, the specific encoder version with which the signal has been generated, the licensing information associated with the signal and/or the encoder version which has generated the signal. The compliance information may be useful for the decoder to initiate a compliance action upon detecting that the compliance information does not match a record, such as a valid licence to generate said signal. In that case, for example, the decoder may initiate a compliance process on the signal, such as interrupting displaying or playback of the signal, sending a request to the source of the transmitted signal to obtain a valid licence, etc.

In other variations, user data may identify objects in the signal, e.g. unique identifier known to the decoder. The user data may also comprise a tag associated with one or more elements of the signal. For example, the tag may comprise identification of whether an element of the signal can be selected by an end user of the signal. In other cases, the tag may comprise identification of whether an element of the signal can be linked to an action to be taken by the end user of the signal, for example clicking on said element and/or linking to a different signal/webpage. In another case, the tag may comprise identification of an element of the signal as belonging to a classification, for example a classification of a video, or a classification of an object. By way of example, the element may represent a person, and the tag would identify who that person is. Alternatively, it may represent an object, and the tag may identify what object that is. Alternatively, it may identify what class an object belongs to. In general, the classification may comprise an association of said element with a class of identifiers, such as a category to which that element belongs.

In certain variations, the reserved symbols may be used to embed a distinct secondary signal as part of the encoded stream, said distinct secondary signal being encoded by means of a given public key and decodable only by decoders knowledgeable about both the existence of the secondary signal and the private key corresponding to the public key used to encrypt the secondary signal.

Although examples have been described in the context of a hierarchical coding format, contextual signal information may also be embedded in encoded data generated with a non-hierarchical coding format. In these cases, the signal processing information may be embedded at macro-block level, using a set of reserved symbols in the quantized coefficients.

Example Apparatus for Implementing the Decoder or Encoder

Figure 15:
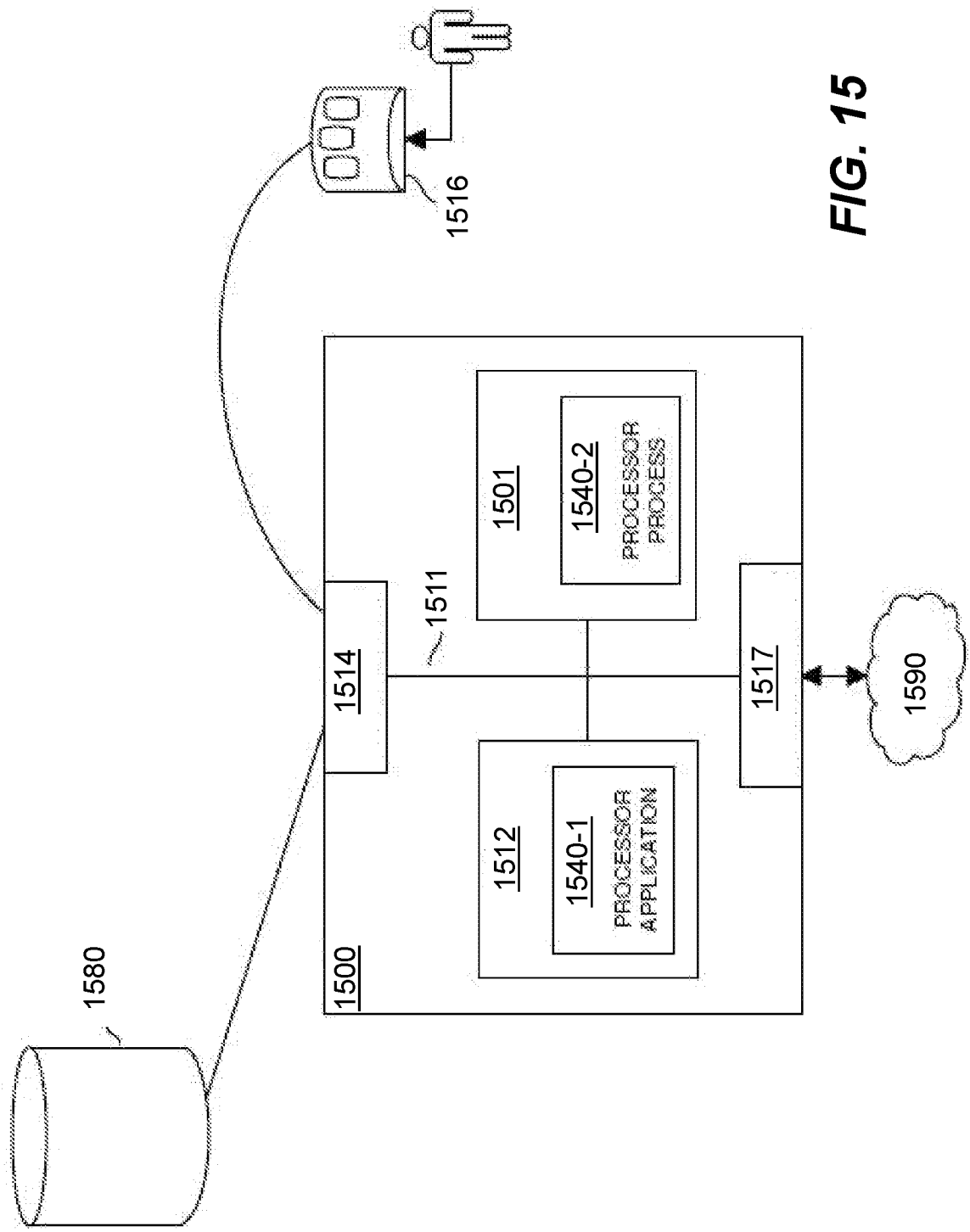
FIG. 15 shows a block diagram of an example of an apparatus in accordance with embodiments.

Referring to FIG. 15, there is shown a schematic block diagram of an example of an apparatus 1500.

Examples of the apparatus 1500 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, a vehicle etc., or in general any type of computing or electronic device.

In this example, the apparatus 1500 comprises one or more processors 1501 configured to process information and/or instructions. The one or more processors 1501 may comprise a central processing unit (CPU). The one or more processors 1501 are coupled with a bus 1511. Operations performed by the one or more processors 1501 may be carried out by hardware and/or software. The one or more processors 1501 may comprise multiple co-located processors or multiple disparately located processors.

In this example, the apparatus 1501 comprises computer-useable memory 1512 configured to store information and/or instructions for the one or more processors 1501. The computer-useable memory 1512 is coupled with the bus 1511. The computer-usable memory may comprise one or more of volatile memory and non-volatile memory. The volatile memory may comprise random access memory (RAM). The non-volatile memory may comprise read-only memory (ROM).

In this example, the apparatus 1500 comprises one or more external data-storage units 1580 configured to store information and/or instructions. The one or more data-external storage units 1580 are coupled with the apparatus 1500 via an I/O interface 1514. The one or more external data-storage units 1580 may for example comprise a magnetic or optical disk and disk drive or a solid-state drive (SSD).

In this example, the apparatus 1500 further comprises one or more input/output (I/O) devices 1516 coupled via the I/O interface 1514. The apparatus 1500 also comprises at least one network interface 1590. Both the I/O interface 1514 and the network interface 1517 are coupled to the systems bus 1511. The at least one network interface 1517 may enable the apparatus 1500 to communicate via one or more data communications networks 1590. Examples of data communications networks include, but are not limited to, the Internet and a Local Area Network (LAN). The one or more I/O devices 1516 may enable a user to provide input to the apparatus 1500 via one or more input devices (not shown). The one or more I/O devices 1516 may enable information to be provided to a user via one or more output devices (not shown).

In FIG. 15, a (signal) processor application 1540-1 is shown loaded into the memory 1512. This may be executed as a (signal) processor process 1540-2 to implement the methods described herein (e.g. to implement suitable encoders or decoders). The apparatus 1500 may also comprise additional features that are not shown for clarity, including an operating system and additional data processing modules. The (signal) processor process 1540-2 may be implemented by way of computer program code stored in memory locations within the computer-usable non-volatile memory, computer-readable storage media within the one or more data-storage units and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 1500 may therefore comprise a data processing module which can be executed by the one or more processors 1501. The data processing module can be configured to include instructions to implement at least some of the operations described herein. During operation, the one or more processors 1501 launch, run, execute, interpret or otherwise perform the instructions.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. It will be appreciated that the apparatus 1500 may comprise more, fewer and/or different components from those depicted in FIG. 15. The apparatus 1500 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of decoding a signal, comprising:
   obtaining an encoded data stream, the encoded data stream being encoded by an encoder according to a tier-based hierarchical format;
   parsing the encoded data stream to determine signal processing information signaled by the encoder;
   reconstructing a higher resolution tier of the signal from a lower resolution tier of the signal; and
   selectively performing one or more signal processing operations to enhance the higher resolution tier based on the determined signal processing information,
   wherein selectively performing one or more processing operations to enhance the higher resolution tier comprises:
   determining operating parameters at a decoder performing the decoding;
   responsive to a first set of operating parameters, performing the one or more signal processing operations to enhance the higher resolution tier using signal processing parameters within the determined signal processing information; and
   responsive to second set of operating parameters, omitting the one or more signal processing operations or substituting the one or more signal processing operations with a default signal processing operation.

2. The method of claim 1, wherein at least part of the data corresponding to the signal processing information is embedded in one or more values received in one or more encoded data layers transmitted within the encoded data stream, wherein said values are associated with transformed coefficients that are processed to derive elements of the signal during the decoding.

3. The method of claim 2, wherein the signal processing information is embedded in one or more values for a predefined transformed coefficient within a set of different transformed coefficients that are generated by an encoding transform.

4. The method of claim 1, wherein at least part of the data corresponding to the signal processing information is encoded within an additional information payload and wherein the additional information payload comprises one or more supplementary enhancement information messages.

5. The method of claim 1, wherein at least part of the data corresponding to the signal processing information is determined based at least in part on a set of predefined values for configuration data for the signal, the configuration data configuring one or more signal processing operations that are not the signal processing operations to enhance the higher resolution tier.

6. The method of claim 1, wherein the one or more signal processing operations are selectively performed prior to adding residual data for the higher resolution tier of the signal and wherein the one or more signal processing operations provide a super-resolution signal.

7. The method of claim 1, wherein the one or more signal processing operations are implemented as part of an upsampling operation, the upsampling operation generating the higher resolution tier of the signal from the lower resolution tier of the signal.

8. The method of claim 1, comprising:
   identifying a signal processing operation to enhance the higher resolution tier using the determined signal processing information;
   determining whether a decoder performing the decoding is capable of implementing the identified signal processing operation;
   responsive to the decoder not being capable of implementing the identified signal processing operation, ignoring the determined signal processing information; and responsive to the decoder being capable of implementing the identified signal processing operation, performing the determined signal processing operation as parameterized by the determined signal processing information.

9. The method of claim 1, comprising:
   determining a resource use metric for a decoder performing the decoding; comparing the resource use metric to a resource use threshold;
   responsive to the comparing indicating an absence of a limitation on resource use for the decoder, performing the one or more signal processing operations to enhance the higher resolution tier based on the determined signal processing information; and responsive to the comparing indicating a limitation on resource use for the decoder, omitting the one or more signal processing operations during the reconstructing.

10. The method of claim 1, wherein the one or more signal processing operations comprise a sharpening filter that is applied in addition to an upsampling operation for the reconstructing, the upsampling operation generating the higher resolution tier of the signal from the lower resolution tier of the signal.

11. The method of claim 10, wherein the determined signal processing information indicates at least one coefficient value for an unsharp mask.

12. The method of claim 11, wherein the determined signal processing information indicates a central integer coefficient value for an unsharp mask.

13. The method of claim 1, wherein the one or more signal processing operations comprise a neural network upsampler.

14. The method of claim 13, wherein the determined signal processing information indicates coefficient values for one or more linear layers of a convolution neural network.

15. The method of claim 1, wherein the one or more signal processing operations comprise an additional upsampling operation that is applied to an output of a last layer with residual data within the tier-based hierarchical format.

16. The method of claim 1, comprising, following reconstructing a higher resolution tier:
applying dithering to an output of the reconstructed higher resolution tier.

17. The method of claim 1, wherein the tier-based hierarchical format is one of MPEG-5 Part 2 LCEVC ("Low Complexity Enhancement Video Coding") and SMPTE VC-6 ST-2117.

18. A decoder comprising:
one or more processors;
non-transitory computer readable storage medium storing computer readable instructions that, when executed by the one or more processors, cause the decoder to perform the following:
obtain an encoded data stream, the encoded data stream being encoded by an encoder according to a tier-based hierarchical format;
parse the encoded data stream to determine signal processing information signaled by the encoder;
reconstruct a higher resolution tier of the signal from a lower resolution tier of the signal; and
selectively performing one or more signal processing operations to enhance the higher resolution tier based on the determined signal processing information,
wherein selectively performing one or more signal processing operations to enhance the higher result ion tier comprises:
determining operating parameters at a decoder performing the decoding;
responsive to a first set of operating parameters, performing the one or more signal processing operations to enhance the higher resolution tier using signal processing parameters within the determined signal processing information; and
responsive to a second set of operating parameters, omitting the one or more signal processing operations or substituting the one or more signal processing operations with a default signal processing operation.

19. A non-transitory computer-readable storage medium storing instructions which, when executed by at least one processor, cause at least one processor to:
obtain an encoded data stream, the encoded data stream being encoded by an encoder according to a tier-based hierarchical format;
parse the encoded data stream to determine signal processing information signaled by the encoder;
reconstruct a higher resolution tier of the signal from a lower resolution tier of the signal; and
selectively performing one or more signal processing operations to enhance the higher resolution tier based on the determined signal processing information,
wherein selectively performing one or more signal processing operations to enhance the higher resolution comprises:
determining operating parameters at a decoder performing the decoding;
responsive to a first set of operating parameters, performing the one or more signal processing operations to enhance the higher resolution tier using signal processing parameters within the determined signal processing information; and
responsive to a second set of operating parameters, omitting the one or more signal processing operations or substituting the one or more signal processing operations with a default signal processing operation.

* * * * *